US012639707B2

(12) United States Patent
Ridzuan Bin Ma Arof et al.

(10) Patent No.: US 12,639,707 B2
(45) Date of Patent: *May 26, 2026

(54) MULTI-FACTOR USER AUTHENTICATION

(71) Applicant: Bank of America Corporation,
Charlotte, NC (US)

(72) Inventors: Ra Uf Ridzuan Bin Ma Arof,
Singapore (SG); Harish Tammaji
Kulkarni, Singapore (SG); Kumudini
Choyal, Tung Chung (HK); Nhat Minh
Nguyen, Singapore (SG); Surendran
Surendran, Singapore (SG)

(73) Assignee: Bank of America Corporation,
Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/796,722

(22) Filed: Aug. 7, 2024

(65) Prior Publication Data

US 2024/0394695 A1     Nov. 28, 2024

Related U.S. Application Data

(63) Continuation of application No. 17/554,348, filed on Dec. 17, 2021, now Pat. No. 12,093,945.

(51) Int. Cl.
*G06Q 20/38* (2012.01)
*G06Q 20/40* (2012.01)
(52) U.S. Cl.
CPC ......... *G06Q 20/385* (2013.01); *G06Q 20/382* (2013.01); *G06Q 20/4016* (2013.01); *G06Q 20/407* (2013.01)

(58) Field of Classification Search
CPC .. G06Q 20/385; G06Q 20/401; G06Q 20/382; G06Q 20/407
(Continued)

(56) References Cited

U.S. PATENT DOCUMENTS

| | | | |
|---|---|---|---|
| 7,844,082 | B2 | 11/2010 | Baentsch et al. |
| 8,700,901 | B2 | 4/2014 | Lund et al. |

(Continued)

FOREIGN PATENT DOCUMENTS

| | | |
|---|---|---|
| DE | 102013102399 B4 | 2/2019 |
| KR | 101754823 B1 | 7/2017 |

(Continued)

OTHER PUBLICATIONS

Monetary Authority of Singapore (MAS); SMS one-time passwords diverted to perform fraudulent card payments; https://www.mas.gov.sg/news/media-releases/2021/sms-one-time-passwords-diverted-to-perform-fraudulent-card-payments; article; 3 pages; Sep. 15, 2021; Government of Singapore.

(Continued)

*Primary Examiner* — Lindsay M Maguire
(74) *Attorney, Agent, or Firm* — Banner & Witcoff, Ltd.

(57) ABSTRACT

A system for multi-factor user authentication for payment card-based transactions are described. The multifactor authentication may be based on a one-time passcode/password (OTP) as sent by an authentication server. A user device may, based on receiving the OTP, send an authentication code. The authentication code may be generated/determined based on the OTP. The authentication code may be augmented biometric identifier (ID) of a user associated with the user device. The authentication server may validate a transaction based on the authentication code.

18 Claims, 15 Drawing Sheets

(58) Field of Classification Search
USPC ............................................................ 705/44
See application file for complete search history.

(56) References Cited

U.S. PATENT DOCUMENTS

| | | |
|---|---|---|
| 9,124,433 B2 | 9/2015 | Marien et al. |
| 9,985,786 B1 | 5/2018 | Bhabbur et al. |
| 2011/0270751 A1 | 11/2011 | Csinger et al. |
| 2013/0097682 A1 | 4/2013 | Zeljkovic et al. |
| 2014/0258132 A1 | 9/2014 | Swamy et al. |
| 2016/0065568 A1 | 3/2016 | Dave et al. |
| 2016/0104152 A1 | 4/2016 | Prabhu et al. |
| 2016/0189136 A1 | 6/2016 | Mercille |
| 2016/0203475 A1 | 7/2016 | Venugopalan et al. |
| 2016/0248752 A1 | 8/2016 | Blinn |
| 2017/0195307 A1 | 7/2017 | Jones-McFadden et al. |
| 2017/0374070 A1 | 12/2017 | Shah et al. |
| 2018/0218371 A1 | 8/2018 | Wang et al. |
| 2019/0114633 A1 | 4/2019 | Gandhi et al. |
| 2019/0279211 A1 | 9/2019 | Goyal et al. |
| 2020/0104474 A1 | 4/2020 | Duane et al. |
| 2020/0127837 A1 | 4/2020 | Kaladgi et al. |
| 2021/0011986 A1 | 1/2021 | Tussy |
| 2021/0157892 A1 | 5/2021 | Duane et al. |
| 2021/0248600 A1 | 8/2021 | Garg et al. |
| 2022/0156352 A1 | 5/2022 | Regier et al. |

FOREIGN PATENT DOCUMENTS

| | | |
|---|---|---|
| KR | 20180096887 A | 8/2018 |
| WO | 2017100929 A1 | 6/2017 |
| WO | 2018025028 A1 | 2/2018 |

OTHER PUBLICATIONS

WIKIPEDIA; "Facial recognition system"; https://en.wikipedia.org/wiki/Facial_recognition_system; article; 32 pages; downloaded Dec. 16, 2021.

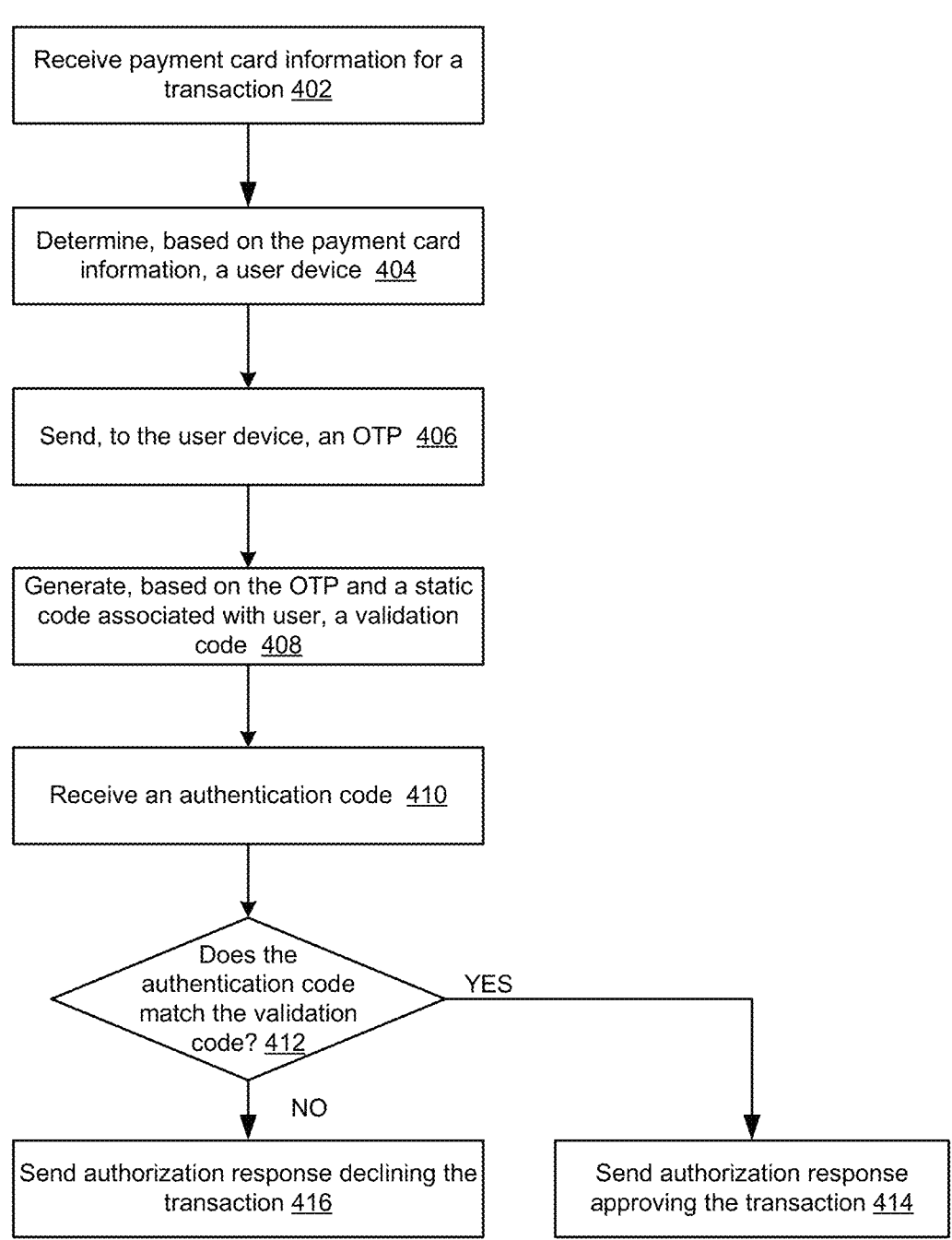

400

Receive payment card information for a transaction 402

Determine, based on the payment card information, a user device 404

Send, to the user device, an OTP 406

Generate, based on the OTP and a static code associated with user, a validation code 408

Receive an authentication code 410

Does the authentication code match the validation code? 412

YES

NO

Send authorization response declining the transaction 416

Send authorization response approving the transaction 414

Send payment card information for a
transaction 1102

Receive an OTP 1106

Receive, via a digital keypad interface, a
user input corresponding to the OTP 1108

Determine, based on a character
mapping, an authentication code
corresponding to the OTP 1110

Send authentication code 1112

1200

MULTI-FACTOR USER AUTHENTICATION

CROSS-REFERENCE TO RELATED APPLICATIONS

This application is a continuation of U.S. application Ser. No. 17/554,348, filed Dec. 17, 2021, the contents of which is hereby incorporated by reference it its entirety.

FIELD

Aspects described herein generally relate to the field of user security, and more specifically to multi-factor user authentication for card-based payment transactions.

BACKGROUND

Payment card-based transactions (e.g., via credit/debit card) have been ubiquitous for both offline and online transactions. To prevent unauthorized use, card issuers (e.g., banks) and payment processors have put in place security protocols that may require additional user authentication. A commonly used protocol is two-factor authentication (or more generally, multi-factor authentication), where in addition to requiring card details (e.g., card number, CVV number, name, expiration date, etc.), the payment processor or a card issuing bank may require a user to validate themselves using an additional layer of authentication. For example, the payment processor or the issuing bank may send a one-time password/passcode (OTP) via an short messaging service (SMS) or an email message to the user. To complete the transaction, the user would need to input the OTP at an interface/portal to complete the transaction.

SUMMARY

Aspects of the disclosure provide solutions that address and overcome technical problems associated with user authentication and fraud prevention for card-based transactions. Specifically, methods, devices, and systems as described herein may use multi-factor authentication (e.g., in addition to standard OTP-based authentication, or augmented with OTP-based authentication) to ensure that card-based transactions are authenticated.

In accordance with one or more arrangements, an apparatus (e.g., an authentication platform) may comprise one or more processors and memory storing instructions that, when executed by the one or more processors, cause the authentication platform to perform on or more operations. The authentication platform may receive, via a payment gateway device, transaction details associated with a card-based payment transaction corresponding to a user. The transaction details may comprise a card number of a payment card. The authentication platform may determine, based on the card number, a user device associated with the user, and send, to the user device, a one-time passcode (OTP). The authentication platform may, after sending the OTP, receive an authentication code. The authentication platform may generate, based on the OTP and a static code associated with the user, a validation code. The authentication platform may, based on comparing the validation code and the authentication code, send, to the payment gateway device, an authorization response indicating whether the transaction is approved or declined.

In at least some arrangements, the authentication platform may generate the validation code further based on a code pattern associated with the user. For example, the authentication platform may generate the validation code by interleaving the OTP and the static code based on the code pattern.

In at least some arrangements, the authentication platform may generate the validation code by appending the static code after the OTP. In at least some arrangements, the authentication platform may generate the validation code by prepending the static code before the OTP.

In at least some arrangements, the authorization response may indicate that the transaction is approved based on the validation code matching the authentication code. In at least some arrangements, the authorization response may indicate that the transaction is declined based on the validation code not matching the authentication code.

In at least some arrangements, the authentication platform may send the OTP via at least one of: a short messaging service (SMS) message; or an electronic mail. In at least some arrangements, the payment card may be a credit card or a debit card. In at least some arrangements, the user device may be a mobile communication device.

In at least some arrangements, the authentication platform may receive the authentication code via the payment gateway device. In at least some arrangements, the authentication platform may send the OTP via a first communication channel, and receive the authentication code via a second communication channel, different from the first communication channel.

In accordance with one or more arrangements, an apparatus (e.g., an authentication platform) may comprise one or more processors and memory storing instructions. The instructions, when executed by the one or more processors, may cause the authentication platform to perform on or more operations. The authentication platform may receive, from a computing device, transaction details associated with a card-based payment transaction corresponding to a user. The transaction details may comprise a card number of a payment card. The authentication platform may determine, based on the card number, a user device associated with the user. The authentication platform may send, to the user device, a one-time passcode (OTP). The authentication platform may after sending the OTP, receive an authentication code and an augmented biometric identifier (ID). The authentication platform may, based on the authentication code and the received augmented biometric ID, send, to the computing device, a message indicating whether the transaction is approved or declined. The computing device may be, for example, a payment gateway device. The computing device may be the same as or different from the user device.

In at least some arrangements, the augmented biometric ID may be based on a three-dimensional (3D) face map generated using a dot projector module integrated with the user device. The augmented biometric ID may comprise the 3D face map that is augmented based on user input at the user device.

In at least some arrangements, the message may indicate that the transaction is approved. The transaction may be approved based on the authentication code matching the OTP, and the augmented biometric ID matching an augmented biometric ID, corresponding to the user, stored at a majority of nodes associated with a plurality of card networks.

In at least some arrangements, the message may indicate that the transaction is declined. The transaction may be decline based on at least one of: the authentication code not matching the OTP, and the augmented biometric ID not matching an augmented biometric ID, corresponding to the user, stored at a majority of nodes associated with a plurality of card networks.

In at least some arrangements, the payment card may be a credit card or a debit card. In at least some arrangements, the user device may be a mobile communication device.

In at least some arrangements, the authentication platform may receive the authentication code and the augmented biometric ID via a payment gateway. In at least some arrangements, the authentication platform may send the OTP via a first communication channel, and receive the authentication code and the augmented biometric ID via a second communication channel, different from the first communication channel.

In accordance with one or more arrangements, an apparatus (e.g., an authentication platform) may comprise one or more processors and memory storing instructions. The instructions, when executed by the one or more processors, may cause the authentication platform to perform on or more operations.

BRIEF DESCRIPTION OF THE DRAWINGS

The present disclosure is illustrated by way of example and not limited in the accompanying figures in which like reference numerals indicate similar elements and in which:

FIG. 4 shows an example algorithm for multi-factor authentication for processing a card-based transaction, in accordance with one or more example arrangements;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

While multi-factor authentication systems (e.g., as described above) may provide security against unauthorized activity in most scenarios, it may not be completely secure. For example, two-factor authentication based on OTP (e.g., as may be sent via an SMS message) may be diverted to a device of an attacker, instead of a device of an authorized user. The attacker may, based on the diverted OTP, initiate an unauthorized card-based transaction.

Figure 1:
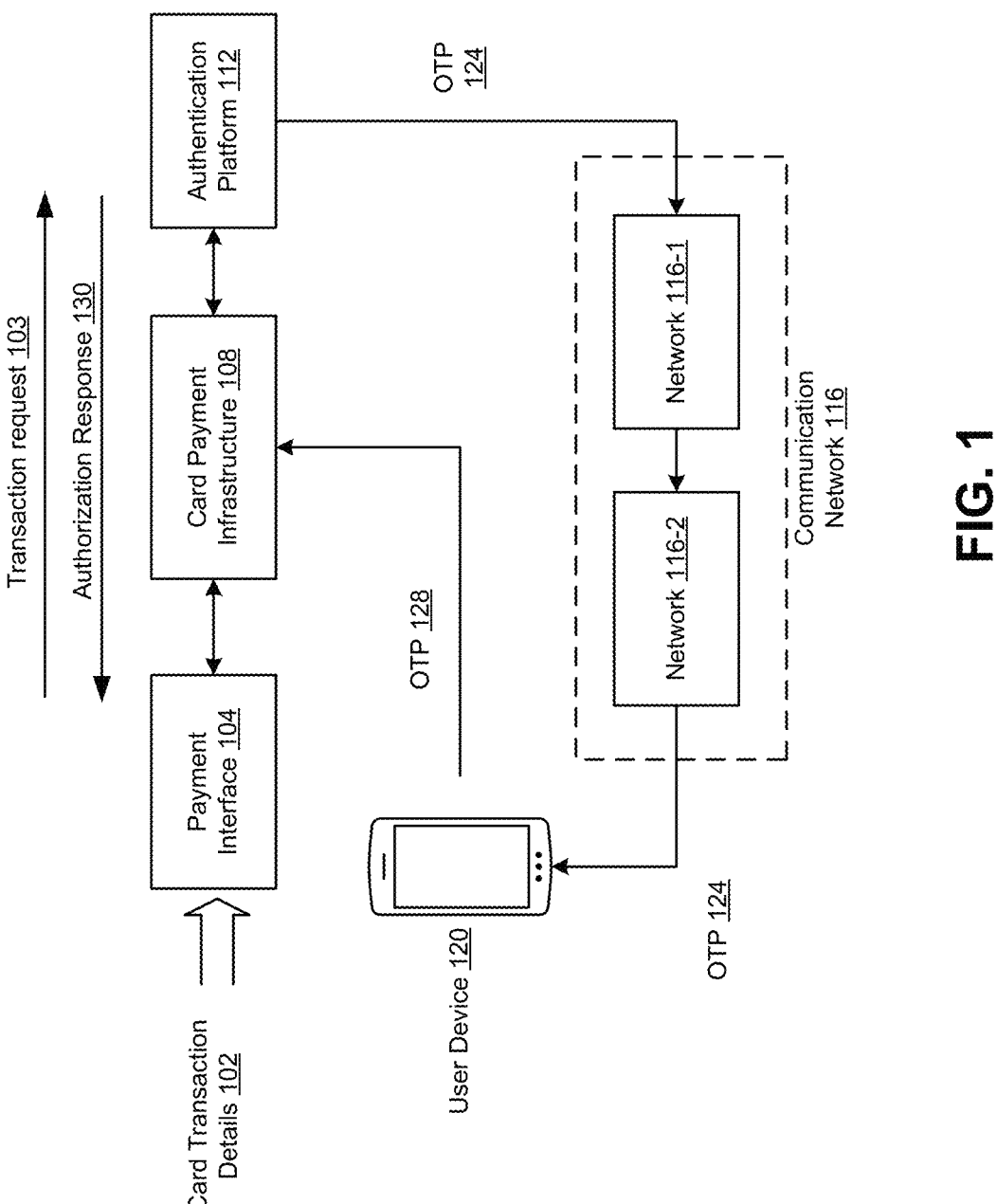
FIG. 1 shows an example procedure for multi-factor authentication, based on an OTP, of a card-based transaction, in accordance with one or more example arrangements.

FIG. 1 shows an example procedure for multi-factor authentication, based on an OTP, of a card-based transaction. A user may initiate/request a card-based transaction (e.g., credit card/debit card payment to a merchant) via a payment interface 104. The user may, for example, input at least some of transaction details 102 for the card-based transaction via the payment interface 104. The transaction details 102 may comprise/indicate one or more of: a card number, CVV number, user name, expiration date, transaction amount, a recipient account number, recipient bank, merchant identifier (ID), merchant category code (MCC), etc. The payment interface 104 may comprise a payment portal provided via a web page associated with an online merchant, and provided on a computing device via which the transaction is being requested. In another example, the payment interface 104 may comprise a card reader device (e.g., at a brick and mortar store) that may be used to scan/read the card and determine at least some of the transaction details 102.

The payment interface 104 may encrypt and send the transaction details 102 (e.g., as part of a transaction request 103) to a network associated with an issuing bank/financial institution of the card. The transaction details 102 may be forwarded to the network by a card payment infrastructure 108 that facilitates communication between the payment interface 104 and the network. The card payment infrastructure 108 may comprise one or more platforms that function as/correspond to a payment gateway, payment processor, card network (e.g., card association) infrastructure, etc., that perform various functions associated with processing a card-based transaction.

For example, the payment interface 104 may send the transaction details 102 to an authentication platform 112 associated with the issuing bank. The network associated with the issuing bank may comprise one or more other platforms to validate the transaction details 102 and confirm that the transaction details 102 are valid (e.g., valid card number, user name, expiration date, etc.). The authentication platform 112 may determine a user associated with card based on the transaction details 102 (e.g., the card number). The authentication platform 112 may determine a user device 120 (e.g., cell phone number) associated with the user based on the transaction details 102. Following this, the authentication platform 112 may send a message (e.g., an SMS message), via a communication network 116 (e.g., a cellular network) to the user device 120, wherein the message may comprise a randomly-generated, single-use OTP 124. In an arrangement, the user device 120 may be the same as the computing device via which the transaction is being made. In an arrangement, the user device 120 may be different from the computing device via which the transaction is being made.

The communication network 116 may comprise networks associated with one or more cellular service providers through which the SMS may be routed to the user device 120. For example, the user device 120 may be roaming in a country different from the home country associated with the user. In this scenario, network 116-1 may correspond to a home network to which the user device 120 is associated with, and network 116-2 may correspond to a network in the country in which the user device 120 is roaming.

Additionally, or alternatively, the OTP 124 may be sent via an email to an email account corresponding to the user. For example, the authentication platform 112 may determine an email address associated with the user based on the transaction details 102, and send the OTP 124 via an email to the email address. The user may access the OTP 124 by logging onto the email account.

The user may input the received OTP 124 at the payment interface 104. In another arrangement, the computing device (e.g., via which the transaction is being requested) may be redirected, following input and sending of the transaction details 102 from the payment interface 104, to an online portal corresponding to the payment gateway, the payment processor platform, the card network, or the issuing bank. The user may input the received OTP 124 at the online portal. The payment interface 104 or the online portal may forward the OTP 128 (e.g., as input by the user) to the authentication platform 112. The OTP 124 may be time-sensitive, and the authentication platform 112 may expect to receive the OTP 128 within a predetermined time period following the sending of the OTP 124 to the user device 120.

The authentication platform 112 may compare the received OTP 128 with the sent OTP 124. Based on the received OTP 128 matching the sent OTP 124, the authentication platform 112 may approve the transaction. Based on the received OTP 128 not matching the sent OTP 124 (or the OTP 128 not being received within the predetermined time period), the authentication platform 112 may decline the transaction. Approving or declining the transaction may further be based on determining whether an account associated with the user/card has sufficient balance or credit for the transaction. For example, the authentication platform 112 may communicate with one or more other servers/platforms within the bank network to determine account details associated with the card and determine whether the account associated with the card has sufficient balance or credit for the transaction. If the transaction is approved, the authentication platform 112 may send, to one or more other platforms in the bank network, an indication to initiate a fund transfer from an account associated with the user/card to the recipient account.

Further, the authentication platform 112 may send an authorization response 130 to the payment processor interface 104, via the card payment infrastructure 108. The authorization response 130 may indicate whether the transaction is approved or declined. The payment interface 104 may indicate whether the transaction is approved or declined based on the authorization response 130.

Figure 2:
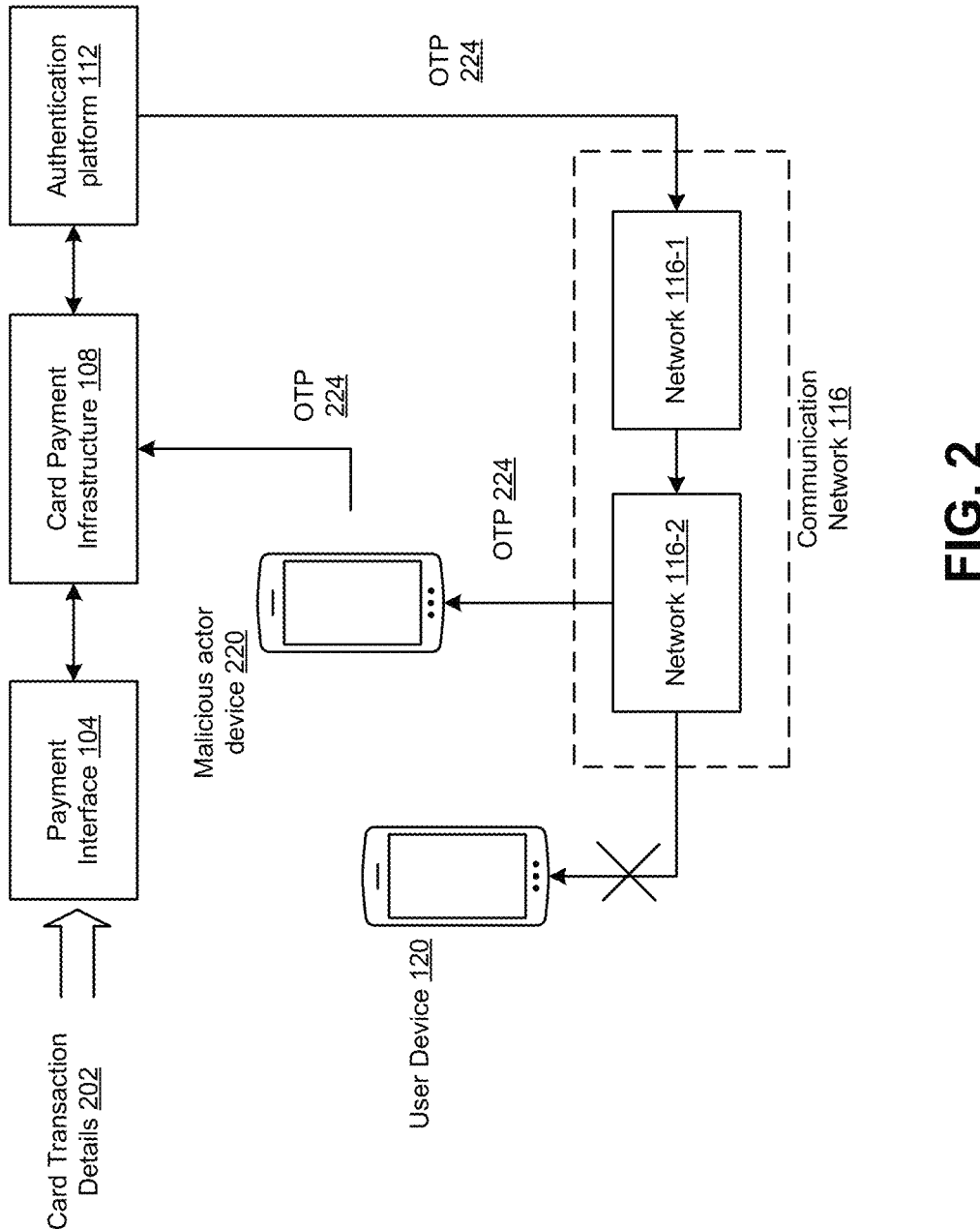
FIG. 2 shows an example procedure that may be employed by a malicious actor to subvert a multi-factor authentication mechanism, in accordance with one or more example arrangements.

FIG. 2 shows an example procedure that may be employed by a malicious actor to subvert a multi-factor authentication mechanism. The malicious actor may be in possession of card details (e.g., card number, user name, expiration date, CVV number, etc.) of an authorized user (e.g., user corresponding to the user device 120). The malicious actor may input transaction details 202 for a card-based transaction (e.g., credit card/debit card transaction) via the payment interface 104.

The payment interface 104 may encrypt and send the transaction details 202 to the card payment infrastructure 108. The card payment infrastructure 108 may forward the transaction details 202 to the network associated with an issuing bank/financial institution of the card. For example, the card payment infrastructure 108 may send the transaction details 202 to an authentication platform 112 associated with the issuing bank. The authentication platform 112 may determine a user associated with card based on the transaction details 202 (e.g., the card number). The authentication platform 112 may determine a cell phone number associated with the authorized user based on the transaction details 202. Following this, the authentication platform 112 may send a message (e.g., an SMS message), via a communication network 116 (e.g., a cellular network) to the cell phone number, wherein the message may comprise a randomly-generated, single-use OTP 224. However, instead of the OTP 224 being sent to the user device 120 of the authorized user (which is a legitimate device corresponding to the cell phone number), the OTP may be diverted to a malicious actor device 220 corresponding to the malicious actor. In an arrangement, the communication network 116 may be compromised in a manner such the communication network 116 may determine that the malicious actor device 220 corresponds to the cell phone number of the authorized user.

For example, the malicious actor may have gained unauthorized access to systems associated with the network 116-2 corresponding to another country, different from the home country of the authorized user. The network 116-2 may be spoofed to assume that the malicious actor device 220, located in the another country, corresponds to the cell phone number of the authorized user. For example, location data of the user device 120 may be modified by the malicious actor (e.g., using malware, or any other type of malicious software) to indicate that it is located in the another country. Further, the network 116-2 may be modified to determine/assume that the malicious actor device 220 corresponds to the authorized user and is located within a service area of the network 116-2. This may result in the OTP 224 being diverted to the malicious actor device 220. The malicious actor may then use the received OTP 224 to validate the unauthorized transaction with the authentication platform 112. The validation may be similar to the procedure as described with respect to FIG. 1.

Various examples as described herein provide an augmented multi-factor authentication mechanism to overcome unauthorized diversion of OTPs associated with multi-factor authentication. As described herein, the OTP, as received at a user device, may be augmented by an additional layer of authentication (e.g., that may be associated with an authorized user) prior to being sent to an authentication server.

The additional layer of authentication may correspond to a static code (e.g., known only to the authorized user), a biometric identifier (ID), a character mapping to convert the OTP to a randomized alphanumeric code, etc. The additional layer of authentication may ensure that a malicious actor would be unable to clear the multi-factor authentication requirements even if the OTP is successfully diverted to the malicious actor device.

Figure 3:
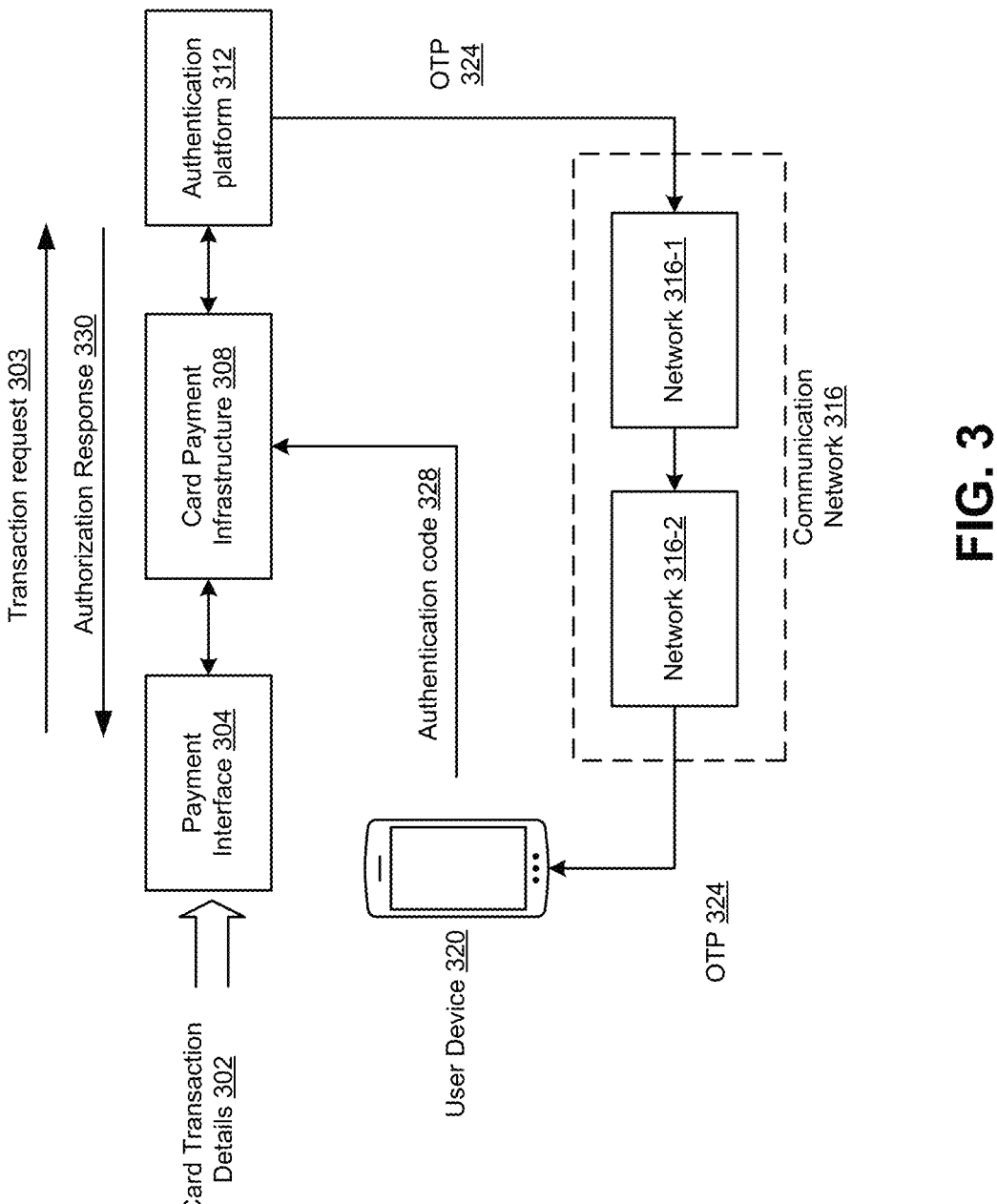
FIG. 3 shows an example procedure for multi-factor authentication, based on an OTP and a static code, of a card-based transaction, in accordance with one or more example arrangements.

FIG. 3 shows an example procedure for an augmented multi-factor authentication, based on an OTP, of a card-based transaction. A user may initiate/request a card-based transaction (e.g., credit card/debit card payment to a merchant) via a payment interface 304. The user may, for example, input at least some of transaction details 302 for the card-based transaction via the payment interface 304. The transaction details 302 may comprise/indicate one or more of: a card number, CVV number, user name, expiration date, transaction amount, a recipient account number, recipient bank, merchant identifier (ID), merchant category code (MCC), etc. The payment interface 304 may comprise a payment portal provided via a web page associated with an online merchant, and provided on a computing device via which the transaction is being requested. In another example, the payment interface 304 may comprise a card reader device (e.g., at a brick and mortar store) that may be used to scan/read the card and determine at least some of the transaction details 302.

The payment interface 304 may encrypt and send the transaction details 102 (e.g., as part of a transaction request 303) to a network associated with an issuing bank/financial institution of the card. The transaction details may be forwarded by a card payment infrastructure 308 that facilitates communication between the payment interface 104 and the network associated with the issuing bank. The card payment infrastructure 308 may comprise on or more platforms that function as/correspond to a payment gateway, payment processor, card network infrastructure, etc., that perform various functions associated with processing a card-based transaction.

For example, the payment interface 304 may send the transaction details 302 to an authentication platform 312 associated with the issuing bank. The network associated with the issuing bank may comprise one or more platforms/servers to review the transaction details 302 to confirm that the transaction details are valid (e.g., valid card number, user name, expiration date, etc.). The authentication platform 312 may determine a user associated with card based on the transaction details 302 (e.g., the card number). The authentication platform 312 may determine a user device 320 (e.g., cell phone number) associated with the user based on the transaction details 302. Following this, the authentication platform 312 may send a message (e.g., an SMS message), via a communication network 316 (e.g., a cellular network, a first communication channel comprising networks 316-1 and/or 316-2) to the user device 320, wherein the message may comprise a randomly-generated, single-use OTP 324. In an arrangement, the user device 320 may be the same as the computing device via which the transaction is being made. In an arrangement, the user device 320 may be different from the computing device via which the transaction is being made.

An authentication code 328 may be determined based on the received OTP 324. For example, the user may be assigned a static code (e.g., private/secret static code associated with the user) which may be known to the user. The user may determine the authentication code 328 based on the static code and the OTP. The user may be assigned the static code, for example, when the user sets up their card account. The static code may be a numeric code or an alphanumeric code.

In an arrangement, a user identifier, corresponding to the user, may be associated with the static code. The user identifier may be based on/correspond to information associated with the card (e.g., one or more of a card number, user name, card account number, bank account number, etc.). The user identifier and the static code may be stored in a user credential database at the authentication platform 312.

The authentication code 328 may be determined using the static code and the OTP, and further based on a code pattern associated with/known to the user. Consider an example where the static code associated with the user is $C_1C_2C_3C_4$, and the OTP 324 is $S_1S_2S_3S_4S_5S_6$. The code pattern may indicate the manner in which the characters/numbers of the static code and the OTP 324 are to be placed for generating the authentication code 328.

The code pattern may indicate that the static code and the OTP are to be interleaved as per a specific pattern to generate the authentication code 328. For example, the code pattern may indicate that the authentication code 328 may be generated as $S_1S_2C_1C_2S_3S_4C_3C_4S_5S_6$. As another example, the code pattern may indicate that the authentication code 328 may be generated as $C_2S_1C_1S_2S_3C_3S_4S_5S_6C_4$.

The code pattern may indicate that the authentication code 328 may be generated by appending the static code after the OTP 324. For example, the code pattern may indicate that the authentication code 328 may be generated as $S_1S_2S_3S_4S_5S_6C_1C_2C_3C_4$.

The code pattern may indicate that the authentication code 328 may be generated by prepending the static code before the OTP 324. For example, the code pattern may indicate that the authentication code 328 may be generated as $C_1C_2C_3C_4S_1S_2S_3S_4S_5S_6$.

The code pattern may indicate that the authentication code 328 may be generated by prepending the static code before the OTP 324. For example, the code pattern may indicate that the authentication code 328 may be generated as $C_1C_2C_3C_4S_1S_2S_3S_4S_5S_6$.

The above are merely illustrations and any other code pattern may be used for generating the authentication code 328 based on the static code and a received OTP. The user may be assigned the code pattern and/or may set the code pattern, for example, when the user sets up their card account. In an arrangement, a user identifier, corresponding to the user, may be associated with the static code as well as the code pattern. The user identifier, and the associated static code and code pattern may be stored in a user credential database at the authentication platform 312.

The user may input the authentication code 328 at the payment interface 304. In another arrangement, the computing device (e.g., via which the transaction is being requested) may be redirected, following input and sending of the transaction details 302 from the payment interface 304, to an online portal corresponding to the payment gateway, the payment processor platform, the card network, or the issuing bank. The user may input the determined authentication code 328 at the online portal. The payment interface 304 or the online portal may forward the authentication code 328 to the authentication platform 312 (e.g., via Internet, using hypertext transfer protocol (HTTP), or any other second communication channel that may be different from the first communication channel). The OTP 324 may be time-sensitive, and the authentication platform 312 may expect to receive the authentication code 328 within a predetermined time period following the sending of the OTP 324 to the user device 320.

The authentication platform 312 may generate a validation code based on the sent OTP 324, the static code associated with the user, and the code pattern associated with the user. For example, and as described above, the static code and the code pattern associated with the user may be stored in the user credential database at the authentication platform 312. The authentication platform 312 may retrieve the code pattern and static code associated with the user, and generate the validation code based on the OTP 324, the code pattern, and the static code in accordance with various examples as described above.

The authentication platform 112 may compare the received authentication code 328 with the validation code. Based on the authentication code 328 matching the validation code, the authentication platform 312 may approve the transaction. Based on the authentication code 328 not matching the validation code (or the authentication code 328 not being received within the predetermined time period), the authentication platform 312 may decline the transaction. Approving or declining the transaction may further be based on determining whether an account associated with the user has sufficient balance or credit for the transaction. For example, the authentication platform 312 may communicate with one or more other servers/platforms within the bank network to determine account details associated with the card and determine whether the account associated with the card has sufficient balance or credit for the transaction. Based on approving the transaction, the authentication platform 312 may send an indication to one or more other servers/platforms within the bank network to initiate processing of the transaction.

The authentication platform 312 may send an authorization response 330 to the payment interface 304, via the card payment infrastructure 308. The authorization response 330 may indicate whether the transaction is approved or declined. The payment interface 304 may indicate whether the transaction is approved or declined based on the authorization response 330.

FIG. 4 shows an example algorithm 400 for multi-factor authentication for processing a card-based transaction. The example algorithm 400 may be performed at an authentication platform (e.g., authentication platform 312). At step 402, the authentication platform may receive card information for a transaction associated with a user (e.g., card number of the user, user name, expiration date, CVV number, etc.). The card information may be indicated in transaction details as input (e.g., by a user and/or at a merchant) via a payment interface at a computing device (e.g., as described with respect to FIGS. 1-3). The card information/transaction details may be received via a payment gateway and a payment processor platform as may be connected to a card-based payment infrastructure.

At step 404, the authentication platform may determine a user device based on the card information. For example, the authentication platform may determine a cell phone number, associated with the user device, corresponding to a card number included in the card information. The card number (or any other card information) may be associated with the cell phone number and may be stored in a user credential database at the authentication platform. The authentication platform may query the user credential database to retrieve the cell phone number corresponding to the card information.

At step 406, the authentication platform may send, to the user device, an OTP. The OTP may be randomly generated. The authentication platform may be sent to the user device via an SMS addressed to the cell phone number corresponding to the user device.

At step 408, the authentication platform may generate a validation code based on the OTP, a static code associated with the user, and a code pattern associated with the user. The static code and the code pattern may be stored in the user credential database and associated with the user (e.g., card number corresponding to the user). The authentication platform may generate the validation code based on sending the OTP to the user device.

At step 410, the authentication platform may receive an authentication code. The authentication code may be input by the user at the payment interface, or at a portal corresponding to the payment processor platform, or a portal associated with the authentication platform. For example, the computing device may be redirected to the portal following the sending of the card information to the authentication platform. The portal may present a graphical user interface (GUI) via which the user may input the authentication code.

At step 412, the authentication platform may determine if the validation code matches the received authentication code. If the validation code matches the received authentication code, the authentication platform may send an authorization response (step 414) approving the transaction. If the validation code does not match the received authentication code, the authentication platform may send an authorization response (step 416) declining the transaction. The authorization response may be sent to the payment gateway via the payment processor platform. The authentication platform may further approve/decline a transaction based on available funds/credit in an account associated with the card. The authentication platform, based on approving the transaction may send one or more indications to one or more other platforms in a network associated with the card-issuing bank. The one or more indications may signal that the transaction may be processed from a source account (e.g., associated with the user/card) to the recipient account.

The procedures described with reference to FIGS. 3 and 4 are simple to implement and may be integrated with existing card-based payment infrastructure. For example, existing protocols and messages associated with standard two-factor authentication (e.g., sending an OTP and receiving a user response) does not need to be modified. The OTP may be sent via an SMS which may ensure that the procedures may function even in scenarios with basic cellular infrastructure (e.g., no internet connectivity).

Even if a malicious actor is able to divert an OTP, the malicious actor may not know the static code and code pattern (which is secret and known only to an authorized user), and would not be able to authenticate the transaction. Even if a malicious actor is able to divert an OTP and is able to gain knowledge of the static code (e.g., via social engineering/phishing), the malicious actor may not know the code pattern. As such, the only way the malicious actor may attempt to authenticate themselves is via trial-and-error by attempting different code patterns. The authenticating platform may block any transactions associated with the card if a number of failed transactions exceeds a threshold. As such, the static code base authentication mechanism described herein has multiple additional layers of security over standard two-factor OTP traditionally used for payment authentication.

While the above examples relate to using static code in multi-factor authentication, other mechanisms to provide an additional authentication over the OTP may be used. For example, a biometric identifier (ID) associated with an authorized user may be recorded and stored in an authentication platform. A user device may send the OTP along with a measured biometric ID for validation at the authentication platform, when performing a transaction. The biometric ID may correspond to a three-dimensional (3D) face map generated using a dot projector module integrated with the user device.

Figure 5:
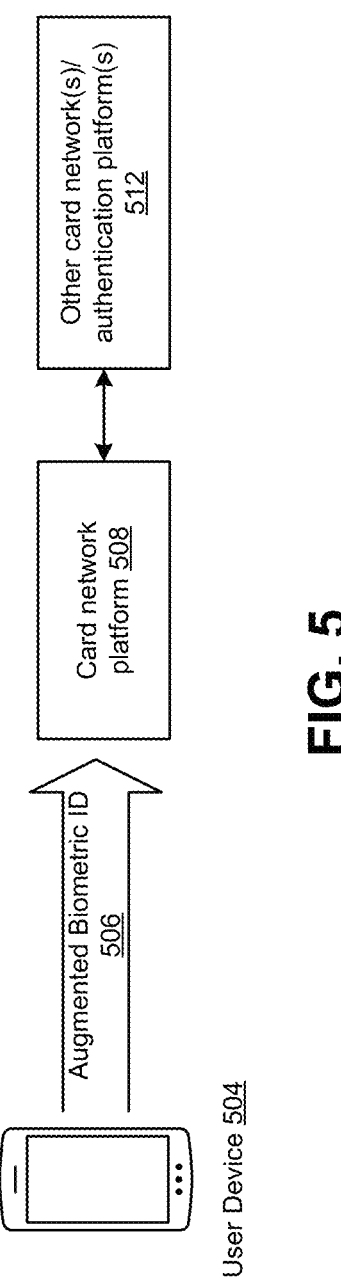
FIG. 5 shows an example procedure for recording a biometric identifier (ID) associated with an authorized user, in accordance with one or more example arrangements.

FIG. 5 shows an example procedure for recording a biometric ID associated with an authorized user. A user device 504 (e.g., a smartphone), corresponding to the authorized user, may comprise an application for recording a biometric ID. In an arrangement, the application (or a link to download the application) may be provided to the user when the user is issued a payment card (e.g., credit/debit card) by an issuing bank. The user device 504 may further comprise an infrared dot projector module that is configured to project a grid for recording and generating a 3D map of the user's face. The application may further enable the user to augment the 3D map to generate an augmented biometric ID 506 corresponding to the user. Augmenting the 3D map may comprise exaggerating and/or diminishing one or more of facial features (e.g., eyes, nose, ears, hair, lips, nose, skin tone, etc.) as recorded by the 3D map. Augmenting the 3D map may comprise selecting, via the application, an augmentation code to exaggerate and/or diminish one or more of the facial features.

The user device 504 may encrypt and send the augmented biometric ID 506 (e.g., the augmented 3D face map) to a card network platform 508 (e.g., a server computer) associated with a card network corresponding to the card. The card network platform 508 may store the augmented biometric ID in a user credential database. Storing the augmented biometric ID 506 may comprise associating the augmented biometric ID 506 with user information (e.g., card number, user name, card account number, bank account number, etc.) corresponding the authorized user.

The user device 504 may also communicate with other platforms 512 (e.g., corresponding to other card networks/authentication platforms corresponding to different banks/financial institutions). The user device 504 may, for example, distribute the augmented biometric ID 506 (and the associated user information) for storage in corresponding user credential databases of the card network platform 508 and other platforms 512. Each of the card network platforms and the authentication platforms may correspond to "nodes" that may be used to validate a future received augmented biometric ID for validating a transaction, as further described herein.

Figure 6:
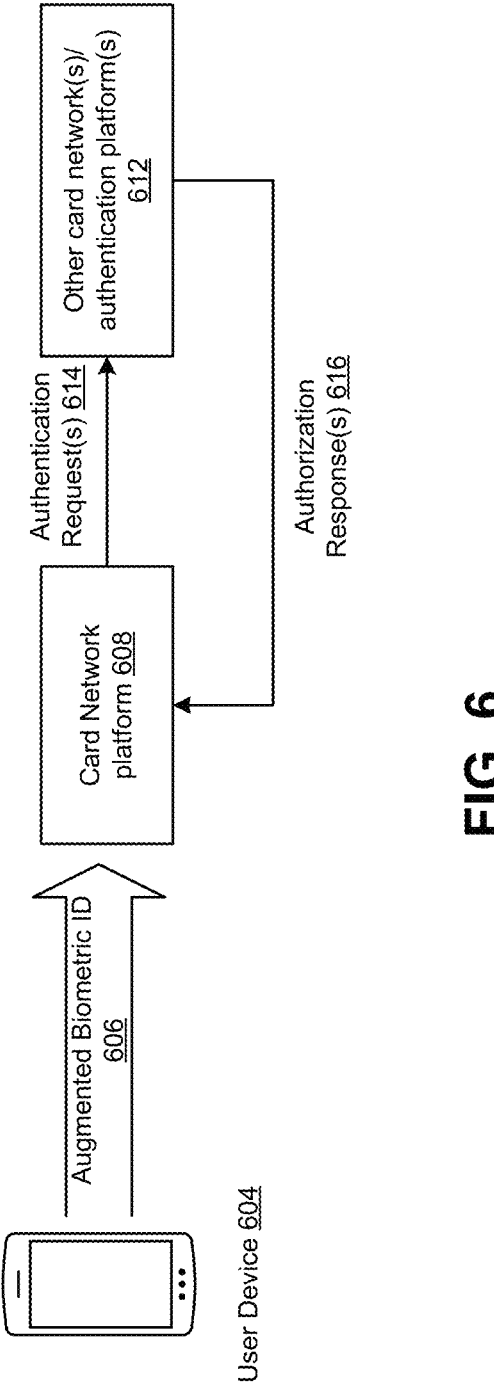
FIG. 6 shows an example procedure for authenticating a transaction based on an augmented biometric ID, in accordance with one or more example arrangements.

FIG. 6 shows an example procedure for authenticating a card-based transaction based on an augmented biometric ID. For example, a user may request a card-based transaction and input transaction details corresponding to the transaction (e.g., via a payment interface, for example, as described with respect to FIG. 1). For example, the transaction details may comprise one or more of a card number, CVV number, user name, expiration date, transaction amount, etc. The transaction details may be sent to one or more platforms (e.g., a payment processor platform, an authentication platform, card network platform 608 associated with card network corresponding to the card, other devices/platforms associated with card-based electronic payments, etc.). The user device 604 may be prompted, by one or more of these platforms, to generate and transmit an augmented biometric ID for validation. For example, the user device 604 may receive a notification, from the card network 608 associated with the card, indicating a request for an augmented biometric ID.

A user device 604 (e.g., a smartphone), corresponding to the user, may comprise the application for recording a biometric ID. Based on receiving the notification, the user device 604 may use the application to generate a 3D map of the user's face using an infrared dot projector integrated with the user device 604. The application may further enable the user to augment the 3D map to generate an augmented biometric ID corresponding to the user. The user may select, via the application, an augmentation code to exaggerate and/or diminish one or more facial features as recorded in the 3D map, and generate the augmented biometric ID.

The user device 604 may encrypt and send the augmented biometric ID 606 (e.g., the augmented 3D face map) to the card network platform 608 associated with the card network. The card network platform 608 may compare the received augmented biometric ID 606 with a stored augmented biometric ID to validate the transaction. For example, the card network platform may retrieve, based on the transaction details, the stored augmented biometric ID corresponding to the user. If the received augmented biometric ID 606 matches the stored augmented biometric corresponding to the user (e.g., as may have been previously stored in a user credential database in accordance with the procedure of FIG. 5), the card network platform 608 may cause sending of an authorization message, approving the transaction, to an issuing bank associated with the card. If the received augmented biometric ID 606 does not match a stored augmented biometric corresponding to the user, the card network platform 608 may decline the transaction.

Alternatively, or in addition to the above, the card network platform 608 may approve or decline the transaction based on communicating with other nodes/platforms 612 (e.g., corresponding to other card networks, authentication platforms corresponding to different banks/financial institutions). For example, the card network platform 608 may send, in authentication request(s) 614, the received augmented biometric ID 606 to the other platforms 612. The other platforms 612 may compare the received augmented biometric ID 606 with respective augmented biometric IDs, corresponding to the user, as stored in respective user credential databases (e.g., as may have been previously stored in the respective user credential databases in accordance with the procedure of FIG. 5) and send respective authorization responses 616 to the card network platform 608. The respective authorization responses 616 may indicate whether the received augmented biometric ID 606 matches the respective augmented biometric IDs as stored in respective user credential databases. Based on the respective authorization responses, the card network platform 608 may determine whether the received augmented biometric ID 606 matches the respective augmented biometric IDs as stored in a majority of the respective user credential databases. If the received augmented biometric ID 606 matches the respective augmented biometric IDs as stored in a majority of the respective user credential databases, the card network platform 608 may cause sending of a transaction request, approving the transaction, to an issuing bank associated with the card. If the received augmented biometric ID 606 matches the respective augmented biometric IDs as stored in a majority of the respective user credential databases, the card network platform 608 may decline the transaction.

Figure 7A:
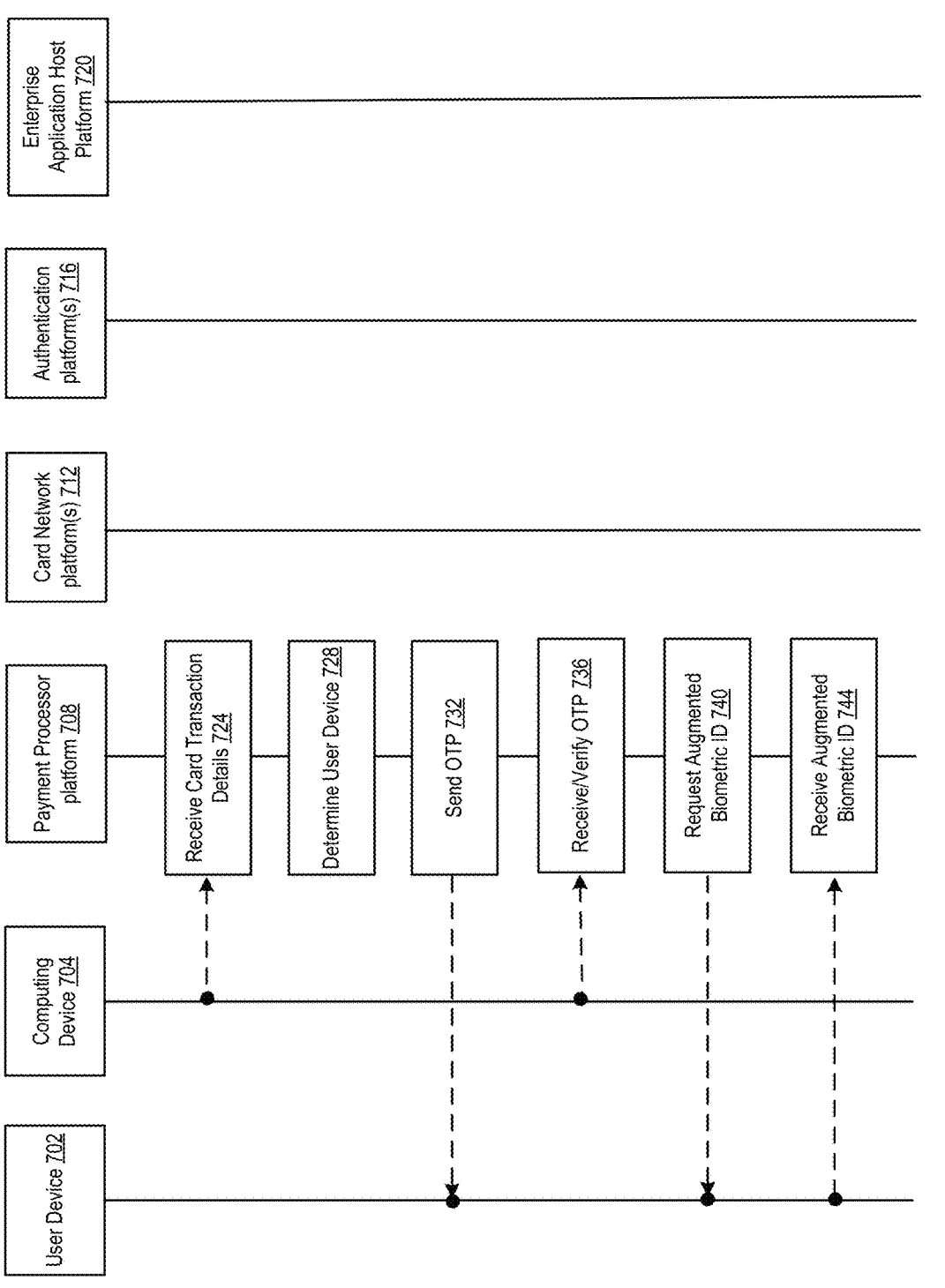
FIGS. 7A and 7B show an example event sequence for multi-factor authentication of a card-based transaction based on an augmented biometric ID, in accordance with one or more example arrangements.
Figure 7B:
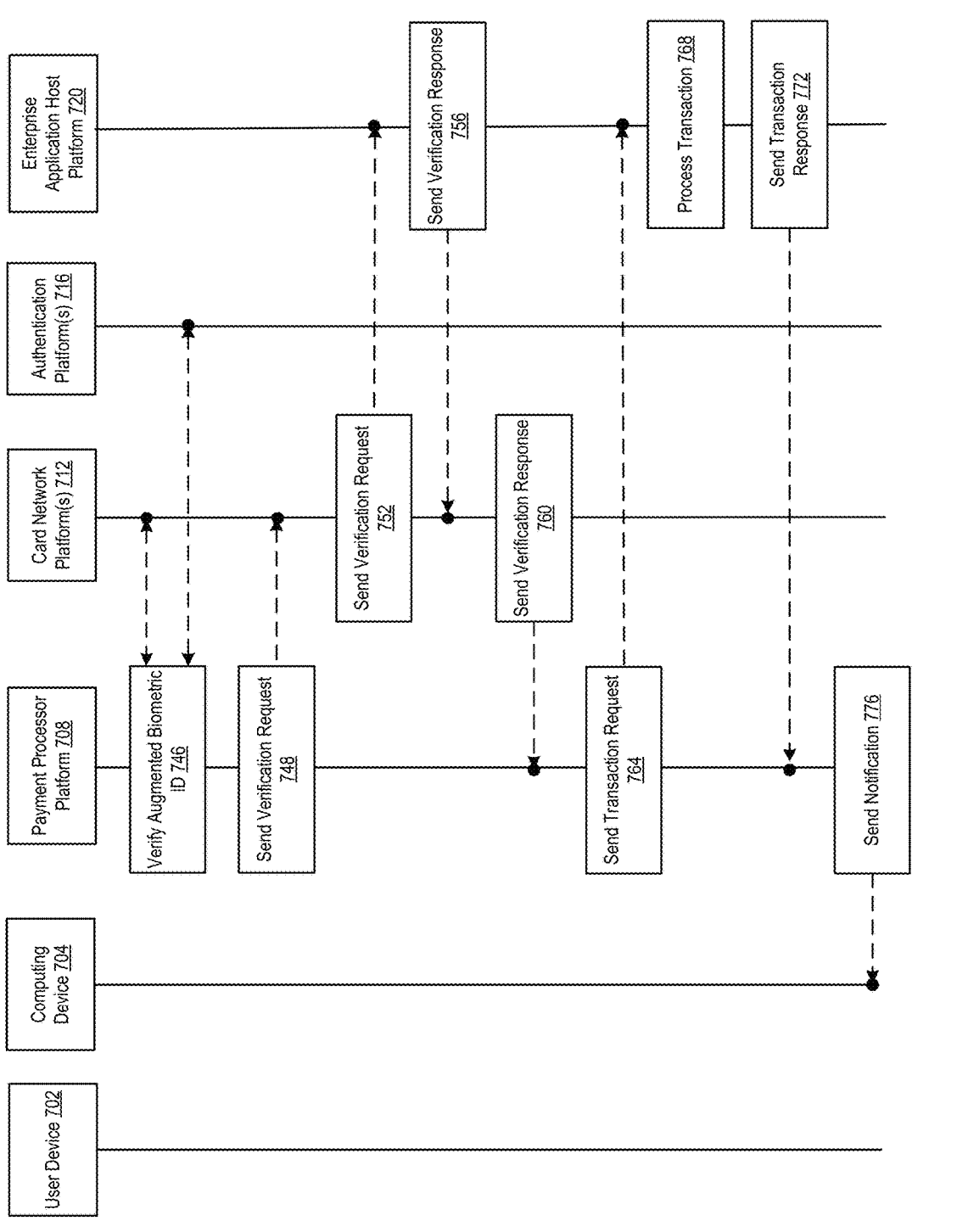

FIGS. 7A and 7B show an example event sequence for multi-factor authentication of a card-based transaction. The multi-factor authentication may use, in addition to or instead of an OTP, an augmented biometric ID associated with an authorized user of a card. A user may input at least some of transaction details for the card-based transaction (e.g., credit card/debit card payment transaction) via a payment interface. The transaction details may comprise/indicate one or more of a card number, CVV number, user name, expiration date, transaction amount, recipient account number, recipient bank ID, etc. The payment interface may correspond to a payment portal provided via a web page associated with an online merchant, and provided on a computing device 704 via which the transaction is being requested. In another example, the computing device 704 may correspond to a card reader device (e.g., at a brick and mortar store) that may be used to scan/read the card and determine at least a portion of the transaction details.

At step 724, a payment processor platform 708 may receive, from the computing device 704, the transaction details. In an arrangement, the payment processor platform 708 may receive the transaction details from the computing device via a payment gateway.

At step 728, the payment processor platform 708 may determine a user device 702 associated with the user based on the transaction details. The user device 702 may be a smartphone and determining the user device 702 may comprise determining a cell phone number corresponding to the user device 702. Following this, the payment processor platform 708 may send, at step 732, a message (e.g., an SMS message), via a communication network (e.g., a cellular network, a first communication channel) to the user device 702, wherein the message may comprise a randomly-generated, single-use OTP. In an arrangement, the user device 702 may be the same as the computing device 704 via which the transaction is being made. In an arrangement, the user device 702 may be different from the computing device 704 via which the transaction is being made.

The user may input the received OTP at the payment interface. In another arrangement, the computing device (e.g., via which the transaction is being requested) may be redirected, following input and sending of the transaction details from the payment interface, to an online portal corresponding to the payment gateway, the payment processor platform 708, the card network, or the issuing bank. The user may input, using the computing device 704, the received OTP at the online portal. The computing device (e.g., via the payment interface or the online portal) may forward the OTP (e.g., as input by the user) to the payment processor platform 708. The OTP may be time-sensitive, and the payment processor platform 708 may expect to receive the OTP within a predetermined time period following the sending of the OTP to the user device 702.

At step 736, the payment processor platform 708 may receive the OTP as input by the user. The payment processor platform 708 may compare the received OTP with the sent OTP. Based on the received OTP matching the sent OTP, the payment processor platform 708 may continue to perform other authentication steps as described below. Based on the received OTP not matching the sent OTP (or the OTP not being received within the predetermined time period), the payment processor platform 708 may decline the transaction.

At step 740, the payment processor platform 740 may send, to the user device 702, a request for an augmented biometric ID corresponding to the user. Based on receiving the notification, the user device 702 may use an application to generate a 3D map of the user's face using an infrared dot projector integrated with the user device 702 (e.g., as described with respect to FIG. 6). The application may further enable the user to augment the 3D map to generate an augmented biometric ID corresponding to the user. The user may select, via the application, an augmentation code to exaggerate and/or diminish one or more facial features as recorded in the 3D map, and generate the augmented biometric ID.

At step 744, the user device 702 may encrypt and send the augmented biometric ID (e.g., the augmented 3D face map) to the payment processor platform 708 associated with the card network. At step 746, the payment processor platform 708 may verify the augmented biometric ID as received from the user device 702. For example, the payment processor platform 708 may comprise, in a local user credential database, a stored augmented biometric ID corresponding to the user. The stored augmented biometric ID may have been previously received from the user device 702 and stored in the local user credential database (e.g., in a manner similar to the procedure of FIG. 5). The payment processor platform 708 may retrieve the stored augmented biometric ID, corresponding to the user, based on the transaction details. Verifying the received augmented biometric ID may comprise comparing the received augmented biometric ID with the stored augmented biometric ID. The payment processor platform 708 may determine that the user is authenticated based on the received augmented biometric ID matching the stored augmented biometric ID. The payment processor platform 708 may determine that the user is not authenticated based on the received augmented biometric ID not matching the stored augmented biometric ID, and may decline the transaction.

In an example, verifying the received augmented biometric ID may comprise comparing the received augmented biometric ID with a respected augmented biometric ID, corresponding to the user, as stored in one or more nodes. The one or more nodes may correspond to different card network platforms 712 (e.g., corresponding to different card networks/card association infrastructures) and/or authentication platforms 716 associated with multiple different banking/financial institutions. The payment processor platform 746 may send the received augmented biometric ID to the one or more nodes. The one or more nodes may compare the received augmented biometric ID with respective stored augmented biometric IDs corresponding to the user (e.g., stored in accordance with the procedure of FIG. 5). The one or more nodes may send notification(s) to the payment processor platform 708 indicating whether the received augmented biometric ID matches the respective stored augmented biometric IDs corresponding to the user. The payment processor platform 708 may determine that the user is authenticated based on majority of the nodes indicating that the received augmented biometric ID matches respective stored augmented biometric IDs corresponding to the user. The payment processor platform 708 may determine that the user is not authenticated based on a majority of the nodes indicating that the received augmented biometric ID does not match respective stored augmented biometric IDs corresponding to the user. Based on this determination, the payment processor platform 708 may decline the transaction.

If the user is determined to be authenticated, the payment processor platform 708 may send a verification request, at step 748, to a card network platform associated with the card. The card network platform may be one of the card network platforms 712. The verification request may comprise one or more of the transaction details. The verification request may request a determination of whether a balance associated with a banking account corresponding to the card exceeds the transaction amount (e.g., if the card is a debit card), or if an available credit associated with the card exceeds the transaction amount (e.g., if the card is a credit card).

At step 752, the card network platform may forward the verification request to an enterprise application host platform 720 associated with a network of a bank/financial institution that issued the card. The enterprise application host platform 720 may, based on the transaction details, determine a balance associated with the banking account corresponding to the card (e.g., if the card is a debit card), or an available credit associated with the card (e.g., if the card is a credit card). The enterprise application host platform 720 may determine whether a balance associated with a banking account corresponding to the card exceeds the transaction amount (e.g., if the card is a debit card), or if an available credit associated with the card exceeds the transaction amount (e.g., if the card is a credit card).

At step 756, an enterprise application host platform 720 may send a verification response to the card network platform. The verification response may indicate whether the transaction is approved. The verification response may indicate that the transaction is approved if a balance associated with a banking account corresponding to the card exceeds the transaction amount, or if an available credit associated with the card exceeds the transaction amount. The verification response may indicate that the transaction is declined if a balance associated with a banking account corresponding to the card exceeds the transaction amount, or if an available credit associated with the card exceeds the transaction amount. At step 760, the card network platform may forward the verification response to the payment processor platform 708.

At step 764, and based on the verification response indicating that the transaction is approved, the payment processor platform 708 may send a transaction request to the enterprise application host platform. The transaction request may comprise the transaction details (e.g., one or more of a card number, CVV number, user name, expiration date, transaction amount, recipient account number, recipient bank). At step 768, the enterprise application host platform 720 may process the transaction. For example, the enterprise application host platform 720 may initiate a fund transfer from an account associated with the card to the recipient account. At step 772, the enterprise application host platform 720 may send, to the payment processor platform 708, a transaction response indicating that the transaction has been processed.

At step 776, the payment processor platform 708 may send a notification to the computing device 704. The notification may indicate that the transaction has been processed, for example, if the payment processor platform receives the transaction response indicating that the transaction has been processed. The notification may indicate that the transaction as been declined, for example, based on at least one of (i) the received OTP not matching the sent OTP (e.g., at step 736), (ii) the received augmented biometric ID not matching the stored augmented biometric ID (e.g., at step 746), or (iii) the verification response indicating that the transaction has been declined (e.g., at step 760).

While FIGS. 7A and 7B shows various steps relating to authenticating the OTP and the augmented biometric ID being performed at a payment processor platform, in other embodiments, other platforms in the network (e.g., an authenticating platform associated with a bank). Further, one or more steps shown in FIGS. 7A and 7B may be omitted.

For example, steps relating to sending an authenticating an OTP may be omitted and the authentication may be based only on verifying an augmented biometric ID.

The event sequence of FIGS. 7A and 7B may ensure that even if an OTP is diverted/compromised, card-based transactions may be secure due to the added additional layer of authentication provided by the augmented biometric ID. Further, the biometric ID (e.g., 3D face scan) may be only stored locally in the user device and only the augmented biometric ID is transmitted. This may ensure that the biometric ID of the user is not compromised, even if a user credential database with the augmented biometric ID is leaked. The augmented biometric ID may be transmitted in an encrypted format adding an additional layer of security. The use of multiple nodes for authenticating the augmented biometric ID may ensure that even if a single node in the network is compromised, the authentication mechanism is not affected (e.g., because a majority of the nodes need to authenticate the augmented biometric ID).

Figure 8:
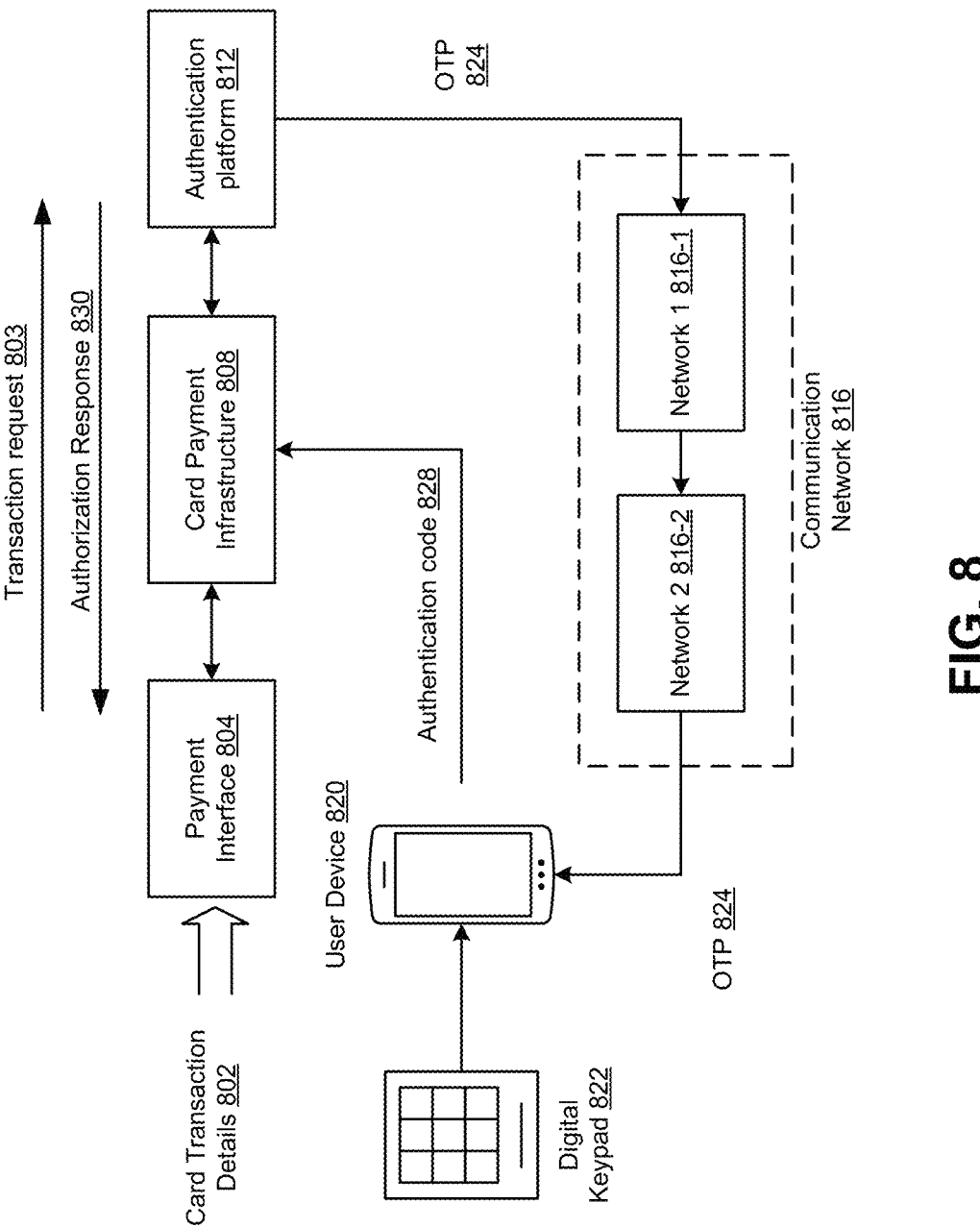
FIG. 8 shows an example procedure for multi-factor authentication, based on an OTP and a digital keypad, of a card-based transaction, in accordance with one or more example arrangements.

FIG. 8 shows an example procedure for multi-factor authentication, based on an OTP, of a card-based transaction. A user may initiate/request a card-based transaction (e.g., credit card/debit card payment to a merchant) via a payment interface 804. The user may, for example, input at least some of transaction details 802 for the card-based transaction via the payment interface 804. The transaction details 802 may comprise/indicate one or more of: a card number, CVV number, user name, expiration date, transaction amount, a recipient account number, recipient bank, merchant identifier (ID), merchant category code (MCC), etc. The payment interface 804 may comprise a payment portal provided via a web page associated with an online merchant, and provided on a computing device via which the transaction is being requested. In another example, the payment interface 804 may comprise a card reader device (e.g., at a brick and mortar store) that may be used to scan/read the card and determine at least some of the transaction details 802.

The payment interface 804 may encrypt and send the transaction details 802 (e.g., as part of a transaction request 803) to a network associated with an issuing bank/financial institution of the card. The transaction details 802 may be forwarded to the network by a card payment infrastructure 808 that facilitates communication between the payment interface 804 and the network. The card payment infrastructure 808 may comprise one or more platforms that function as/correspond to a payment gateway, payment processor, card network infrastructure, etc., that perform various functions associated with processing a card-based transaction.

For example, the payment interface 804 may send the transaction details 802 to an authentication platform 812 associated with the issuing bank. The network associated with the issuing bank may comprise one or more other platforms to validate the transaction details 802 and confirm that the transaction details 802 are valid (e.g., valid card number, user name, expiration date, etc.). The authentication platform 812 may determine a user associated with card based on the transaction details 802 (e.g., the card number). The authentication platform 812 may determine a user device 820 (e.g., cell phone number) associated with the user based on the transaction details 802. Following this, the authentication platform 812 may send a message (e.g., an SMS message), via a communication network 816 (e.g., a cellular network, a first communication channel) to the user device 820, wherein the message may comprise a randomly-generated, single-use OTP 824. In an arrangement, the user device 820 may be the same as the computing device via which the transaction is being made. In an arrangement, the user device 820 may be different from the computing device via which the transaction is being made.

The communication network 816 may comprise networks associated with one or more cellular service providers through which the SMS may be routed to the user device 820. For example, the user device 820 may be roaming in a country different from the home country associated with the user. In this scenario, network 816-1 may correspond to a home network to which the user device 820 is associated with, and network 816-2 may correspond to a network in the country in which the user device 820 is roaming.

Additionally, or alternatively, the OTP 824 may be sent via an email to an email account corresponding to the user. For example, the authentication platform 812 may determine an email address associated with the user based on the transaction details 802, and send the OTP 824 via an email to the email address. The user may access the OTP 824 by logging onto the email account.

The user device 820 may comprise/be configured with a digital keypad application 822 that may be used to input the OTP 824. In an arrangement, the digital keypad application 822 (or a link to download the digital keypad application 822) may be provided to the user when the user is issued the card by the issuing bank. In an arrangement, the digital keypad application 822 may be integrated into an online banking application associated with the issuing bank. When the user device 820 receives the OTP 824, the user may input the OTP 824 at the user device 820 using on-screen buttons, corresponding to the digital keypad application 822, as presented on a touch-screen display of the user device 820.

Figure 9:
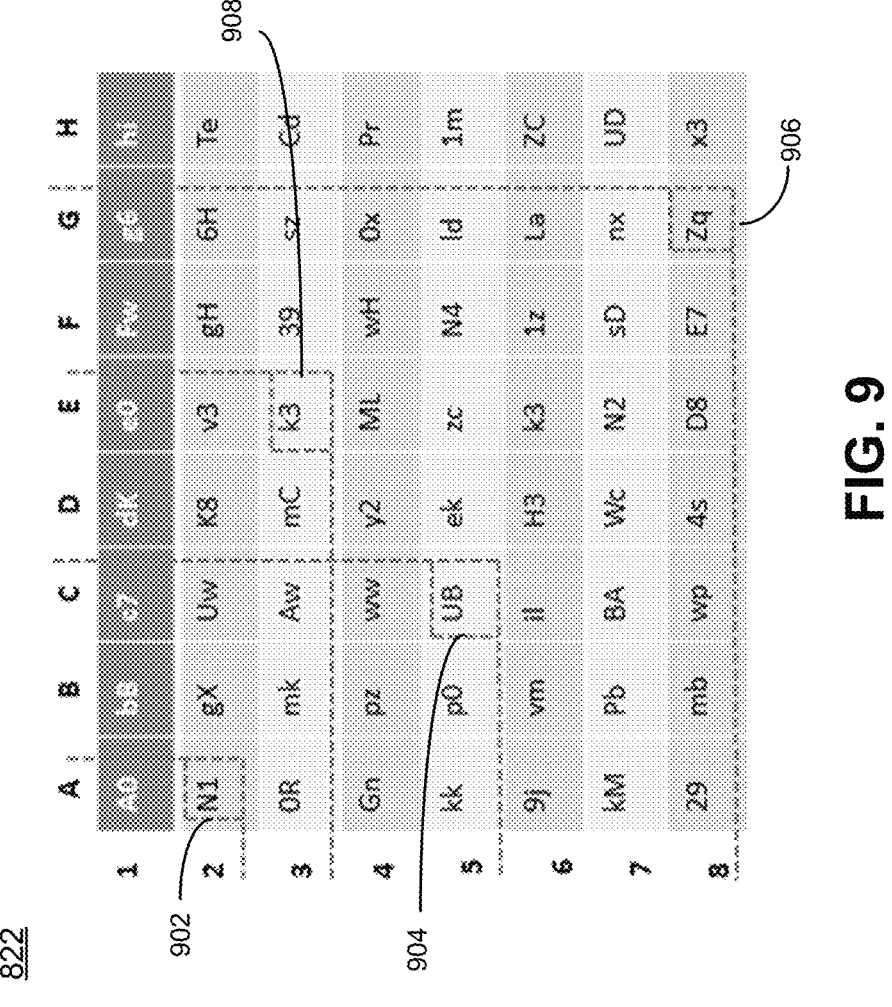
FIG. 9 shows an example graphical user interface (GUI) corresponding to the digital keypad application at a user device, in accordance with one or more example arrangements.

FIG. 9 shows an example GUI corresponding to the digital keypad application 822 at the user device 820. The GUI may present a plurality of buttons (e.g., in a grid format), where each of the buttons may correspond to an alphanumeric code that may be included in the OTP 824. In an example arrangement, the columns of the grid may correspond to a first character of the alphanumeric code, and the rows of the grid may correspond to a second character of the alphanumeric code. The user may input the OTP 824 by touching the buttons corresponding to the rows and the columns indicated by alphanumeric codes included in the OTP 824.

For example, consider an example where the OTP 824 is A2 C5 G8 E3. The alphanumeric code A2 may be input by the user by selecting a button 902 corresponding to the column A and the row 2. The alphanumeric code C5 may be input by the user by selecting a button 904 corresponding to the column C and the row 5. The alphanumeric code G8 may be input by the user by selecting a button 906 corresponding to the column G and the row 8. The alphanumeric code E3 may be input by the user by selecting a button 908 corresponding to the column E and the row 3. While the example digital keypad application 822 as shown in FIG. 9 has buttons with alphanumeric codes based on rows/columns corresponding to alphanumeric codes as may be present in the OTP 824, in other arrangements, the digital keypad application 822 may be a regular numeric keypad, or alphanumeric keypad, with each button corresponding to a character as may be present in the OTP 824.

Each of the buttons (e.g., or alphanumeric codes/characters associated with the buttons) may be mapped to a corresponding encoded alphanumeric code/encoded characters. For example, as shown in FIG. 9, alphanumeric code A1 may be mapped to the encoded alphanumeric code N1, alphanumeric code C5 may be mapped to the encoded code UB, alphanumeric code E3 may be mapped to the encoded alphanumeric code k3, alphanumeric code G8 may be mapped to the encoded alphanumeric code Zq, etc.

With reference to example where the OTP 824 is A2 C5 G8 E3, the alphanumeric code A2 of the OTP 824 may map to encoded alphanumeric code N1. The alphanumeric code C5 of the OTP 824 may map to encoded alphanumeric code UB. The alphanumeric code G8 of the OTP 824 may map to encoded alphanumeric code Zq. The alphanumeric code E3 of the OTP 824 may map to encoded alphanumeric code k3. An authentication code 828 may comprise the encoded alphanumeric codes mapped to the alphanumeric codes included in the OTP 824. Thus, the OTP 824 A2 C5 G8 E3 may result in generation of the authentication code 828 N1 UB Zq k3.

Based on input of the OTP 824, the user device 820 may send to the authentication platform 812 (e.g., via the card payment infrastructure 808), the authentication code 828. The user device 820 the authentication code 828 to the authentication platform 812 (e.g., via Internet, using hypertext transfer protocol (HTTP), or any other second communication channel that may be different from the first communication channel). The OTP 824 may be time-sensitive, and the authentication platform 812 may expect to receive the authentication code 828 within a predetermined time period following the sending of the OTP 824 to the user device 820.

The authentication platform 812 may generate a validation code based on the sent OTP 824 and a mapping associated with the user. The mapping may be between alphanumeric codes (e.g., as may be used in an OTP) and encoded alphanumeric codes. The mapping used at the authentication platform 812 and the mapping used at the digital keypad application 822 may be synchronized such that a same mapping is used for generating the validation code (e.g., at the authentication platform 812) and the authentication code 828 (e.g., at the user device 820). For example, the authentication platform 812 may generate a random mapping and transmit the mapping to the user device 820 (e.g., for use by the digital keypad application 822). The authentication platform 812 may then use the same mapping for generating the validation code associated with the user. In this manner, the authentication platform 812 may maintain a synchronization between the authentication platform 812 and the digital keypad application 822. The mapping may be periodically refreshed (e.g., every minute, every 5 minutes, etc.) to maintain security.

The authentication platform 812 may compare the received authentication code 828 with the validation code. Based on the authentication code 828 matching the validation code, the authentication platform 812 may approve the transaction. Based on the authentication code 828 not matching the validation code (or the authentication code 828 not being received within the predetermined time period), the authentication platform 812 may decline the transaction. Approving or declining the transaction may further be based on determining whether an account associated with the user has sufficient balance or credit for the transaction. For example, the authentication platform 812 may communicate with one or more other servers/platforms within the bank network to determine account details associated with the card and determine whether the account associated with the card has sufficient balance or credit for the transaction. Based on approving the transaction, the authentication platform 812 may send an indication to one or more other servers/platforms within the bank network to initiate processing of the transaction.

The authentication platform 812 may send an authorization response 830 to the payment interface 804, via the card payment infrastructure 808. The authorization response 830 may indicate whether the transaction is approved or declined. The payment interface 804 may indicate whether the transaction is approved or declined based on the authorization response 830.

Figure 10:
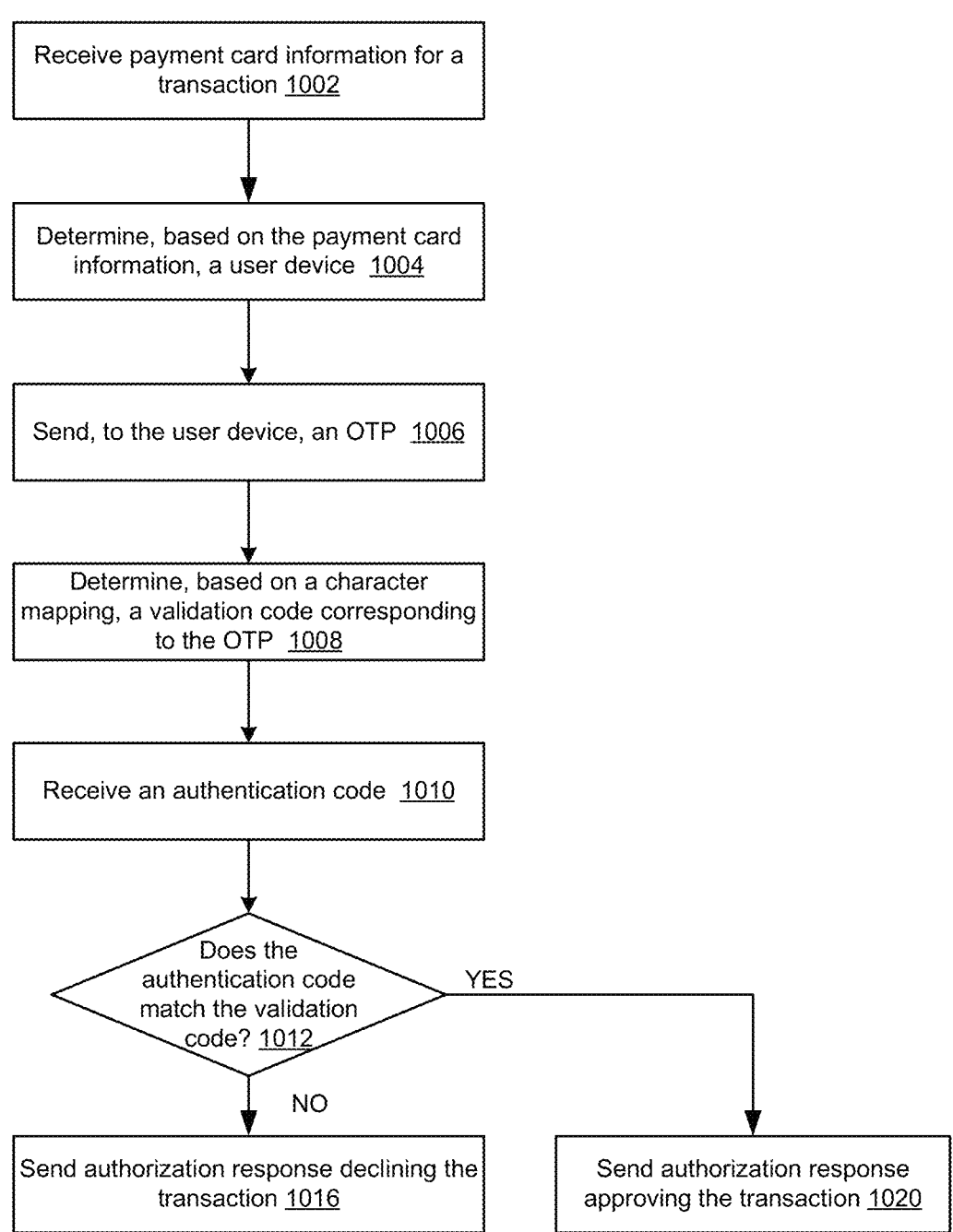
FIG. 10 shows an example algorithm for multi-factor authentication for processing a card-based transaction, in accordance with one or more example arrangements.

FIG. 10 shows an example algorithm 1000 for multi-factor authentication for processing a card-based transaction. The example algorithm 1000 may be performed at an authentication platform (e.g., the authentication platform 812) associated with a bank network.

At step 1002, the authentication platform may receive card information for a transaction associated with a user (e.g., card number of the user, user name, expiration date, CVV number, etc.). The card information may be indicated in transaction details as input (e.g., by a user and/or at a merchant) via a payment interface at a computing device (e.g., as described with respect to FIG. 8). The card information/transaction details may be received via a payment gateway and a payment processor platform as may be connected to a card-based payment infrastructure.

At step 1004, the authentication platform may determine a user device based on the card information. For example, the authentication platform may determine a cell phone number, associated with the user device, corresponding to a card number included in the card information. The card number (or any other card information) may be associated with the cell phone number and may be stored in a user credential database at the authentication platform. The authentication platform may query the user credential database to retrieve the cell phone number corresponding to the card information.

At step 1006, the authentication platform may send, to the user device, an OTP. The OTP may be randomly generated. The authentication platform may be sent to the user device via an SMS addressed to the cell phone number corresponding to the user device.

At step 1008, the authentication platform may generate a validation code based on the OTP and a character mapping associated with the user. Each character of the OTP (or each numeric/alphanumeric code in the OTP) may be mapped to corresponding encoded character(s) (or corresponding encoded numeric/alphanumeric code(s)). The validation code (comprising the encoded characters, or numeric/alphanumeric codes) may be generated, based on the OTP, using the mapping. The mapping may be periodically generated and stored in the user credential database and associated with the user (e.g., card number corresponding to the user). The authentication platform may generate the validation code based on sending the OTP to the user device.

At step 1010, the authentication platform may receive an authentication code. The authentication code may be generated based on user input via a dynamic digital keypad interface. The dynamic digital keypad interface may map characters of the user input (or numeric/alphanumeric codes in the user input) to encoded characters (or encoded numeric/alphanumeric codes). The authentication code may comprise the encoded characters (or numeric/alphanumeric codes) as determined based on the mapping of the digital keypad interface.

At step 1012, the authentication platform may determine if the validation code matches the received authentication code. If the validation code matches the received authentication code, the authentication platform may send an authorization response (step 1020) approving the transaction. If the validation code does not match the received authentication code, the authentication platform may send an authorization response (step 1016) declining the transaction. The authorization response may be sent to the payment gateway via the payment processor platform. The authentication platform may further approve/decline a transaction based on available funds/credit in an account associated with the card. The authentication platform, based on approving the transaction may send one or more indications to one or more other platforms in a network associated with the card-issuing bank. The one or more indications may signal that the transaction may be processed from a source account (e.g., associated with the user/card) to the recipient account.

Figure 11:
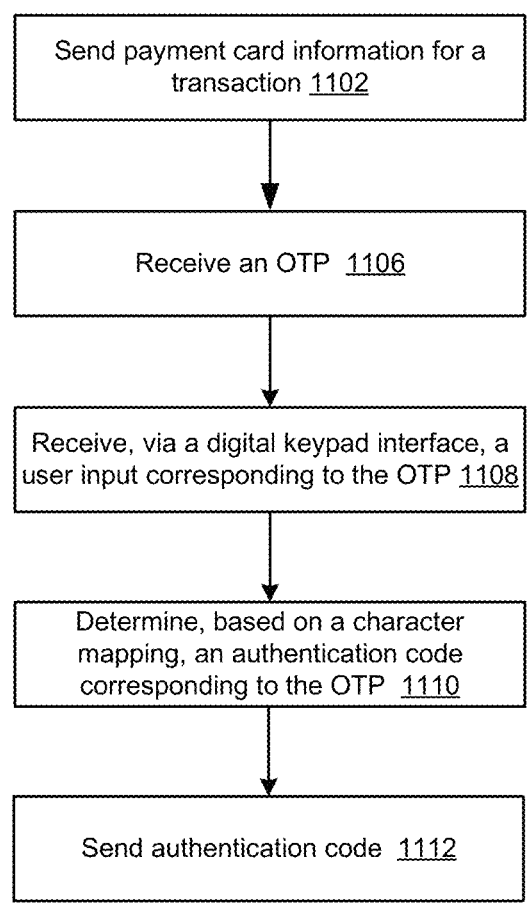
FIG. 11 shows an example algorithm for multi-factor authentication for processing a card-based transaction, in accordance with one or more example arrangements.

FIG. 11 shows an example algorithm 1100 for multi-factor authentication for processing a card-based transaction. The example algorithm 1100 may be performed at an user device (e.g., the user device 820) corresponding to an authorized user of the card.

At step 1102, the user device may send card information for a transaction associated with the user (e.g., card number of the user, user name, expiration date, CVV number, etc.). The card information may be indicated in transaction details as input (e.g., by a user and/or at a merchant) via a payment interface at the user device. The card information/transaction details may be sent via a payment gateway and a payment processor platform as may be connected to a card-based payment infrastructure.

At step 1106, the user device may receive an OTP as transmitted by an authentication platform associated with an issuing bank of the card. The user device may receive the OTP via an SMS.

At step 1108, the user device may receive, via a digital keypad interface, a user input corresponding to the OTP. At step 1110, the user device may determine, based on a character mapping, an authentication code corresponding to the OTP. For example, the digital keypad interface may map, based on the character mapping, characters of the user input to encoded characters. The authentication code may comprise the encoded characters. At step 1112, the user device may send the authentication code to the authentication platform for validation.

The techniques outlined in FIGS. 8-11 may ensure that only an authorized user of the card may initiate and authenticate transactions. Only the authorized user may be allowed to download and install the digital keypad application/interface that may be used to input the OTP. For example, even if the OTP is compromised, a malicious actor may not have the digital keypad application/interface to input the OTP. Security is further enhanced by enabling periodic refreshing of the mapping used by the digital keypad application and the authentication platform.

Figure 12:
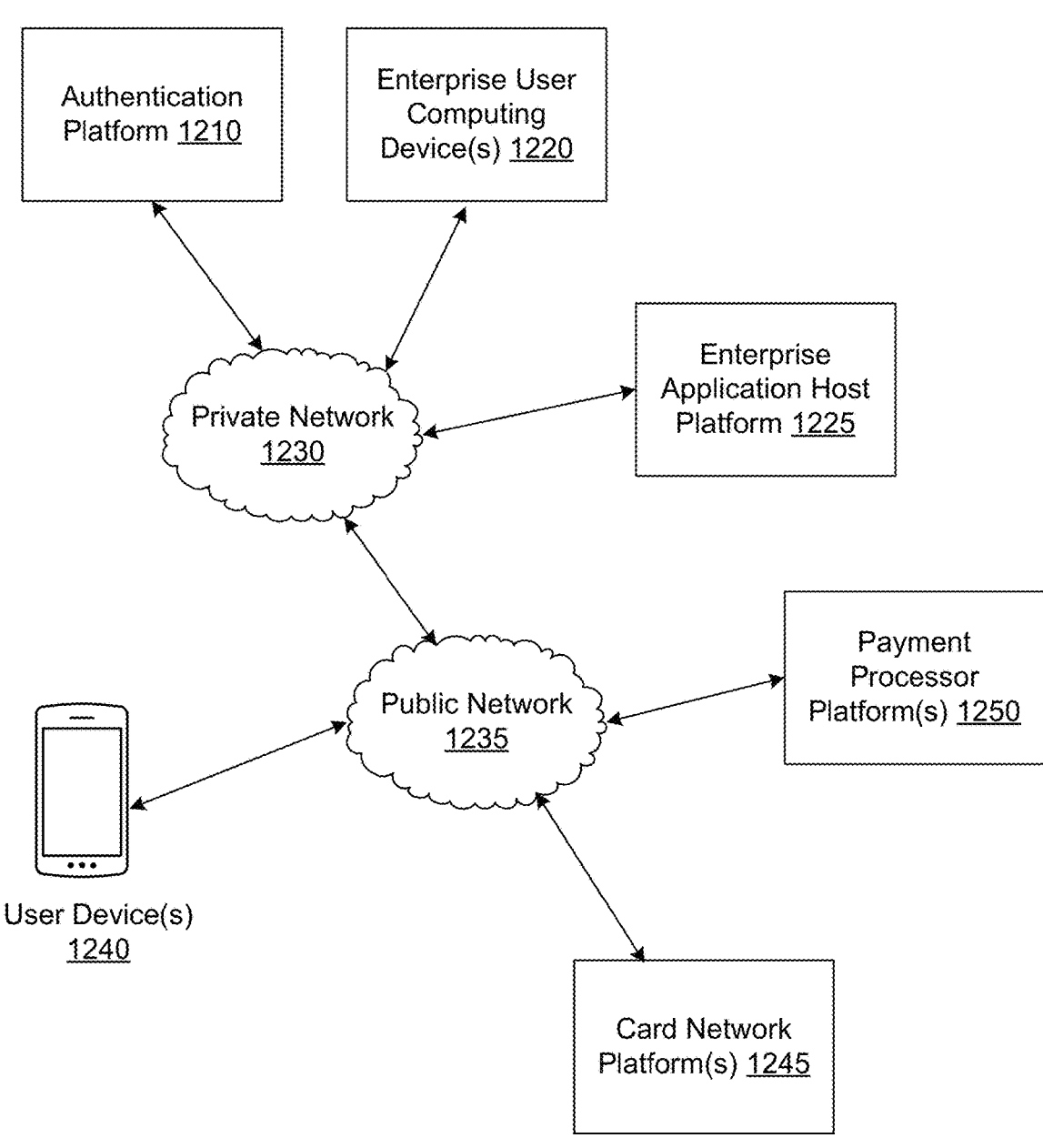
FIG. 12 shows an illustrative computing environment in which an authentication system for processing card-based transactions may be deployed, in accordance with one or more example arrangements.

FIG. 12 shows an illustrative computing environment 1200 in which an authentication system for processing card-based transactions may be deployed, in accordance with one or more arrangements. The computing environment 1200 may comprise one or more devices (e.g., computer systems, communication devices, and the like). The computing environment 1200 may comprise, for example, an authentication platform 1210, an enterprise application host platform 1225, and/or one or more enterprise user computing devices 1220. The one or more of the devices and/or systems, may be linked over a private network 1230. In an arrangement, the private network 1230 may be associated with an enterprise organization (e.g., a bank/financial institution). For example, the private network 1230 may correspond to a network associated with an issuing bank of a payment card (e.g., credit card, debit card). The payment card may be issued to an authorized user for initiating transactions.

The computing environment 1200 may additionally comprise one or more external devices/systems connected, via a public network 1235, to the devices in the private network 1230. For example, the public network 1235 may comprise user device(s) 1240 that may be used to initiate card-based transactions. The public network 1235 may further comprise various platforms associated with a card payment infrastructure that facilitates card-based transactions. For example, the public network 1235 may comprise one or more payment processor platform(s) 1250 and one or more card network platform(s) 1245.

The devices in the computing environment 1200 may transmit/exchange/share information via hardware and/or software interfaces using one or more communication protocols. The communication protocols may be any wired communication protocol(s), wireless communication protocol(s), one or more protocols corresponding to one or more layers in the Open Systems Interconnection (OSI) model (e.g., local area network (LAN) protocol, an Institution of Electrical and Electronics Engineers (IEEE) 802.11 WIFI protocol, a $3^{rd}$ Generation Partnership Project (3GPP) cellular protocol, a hypertext transfer protocol (HTTP), and the like).

The authentication platform 1210 may comprise one or more computing devices and/or other computer components (e.g., processors, memories, communication interfaces) configured to perform one or more functions as described herein (e.g., as described with reference to FIGS. 1-11). For example, the authentication platform 1210 may comprise one or more computers (e.g., laptop computers, desktop computers, servers, server blades, or the like). As described herein, the authentication platform 1210 may authenticate a user requesting a card-based payment transaction using multi-factor authentication. The authentication may be based on one or more of an OTP, a static code associated with the user, an augmented biometric ID associated with the user, a mapping used for digital keypad application/interface at a user device, etc.

The enterprise application host platform 1225 may comprise one or more computing devices and/or other computer components (e.g., processors, memories, communication interfaces). In addition, the enterprise application host platform 1225 may be configured to host, execute, and/or otherwise provide one or more enterprise applications. In an arrangement where the private network 1230 is associated with a banking/financial organization, the enterprise application host platform 1225 may be configured, for example, to host, execute, and/or otherwise provide one or more transaction processing programs, such as online banking applications, fund transfer applications, data transmission applications, and/or other programs associated with the financial institution. The enterprise application host platform 1225 may comprise various servers and/or databases that store and/or otherwise maintain account information, such as financial account information including account balances, transaction history, account owner information, and/or other information. In addition, the enterprise application host platform 1225 may process and/or otherwise execute transactions on specific accounts based on commands and/or other information received from other computer systems comprising the computing environment 1200.

For example, the enterprise application host platform 1225 may determine available funds in a user account associated with a debit card, or an available credit corresponding to a credit card (e.g., as described at step 756). Based the determining, the enterprise application host platform 720 may initiate a card-based payment transaction (e.g., fund transfer to a recipient account), or send a notification to one or more platforms in the computing environment 1200 indicating that the transaction may be approved.

The enterprise user computing device(s) 1220 and/or the user device(s) 1240 may be personal computing devices (e.g., desktop computers, laptop computers) or mobile computing devices (e.g., smartphones, tablets). The enterprise user computing device(s) 1220 may be linked to and/or operated by specific enterprise users (who may, for example, be employees or other affiliates of the enterprise organization).

The user device(s) 1240 may be linked to and/or operated by clients associated with the banking/financial organization (e.g., who may have been issued payment cards). The user device(s) 1240 may be used to request a credit/debit card transaction via a payment interface (e.g., an online payment portal). A user device 1240 may be a cellphone to which an OTP may sent (e.g., by an authentication platform, payment processor platform, etc.). A user device 1240 may be a smartphone that may be used to generate and transmit an augment biometric ID for validation at the authentication platform 1210. A user device 1240 may be a smartphone that may comprise a digital keypad interface that may be used to input a received OTP.

The payment processor platform(s) 1250 and the card network platform(s) 1245 may comprise one or more computing devices and/or other computer components (e.g., processors, memories, communication interfaces). The payment processor platform(s) 1250 may correspond to one or more payment processors. The card network platform(s) 1245 may correspond to one or more card networks/card associations. The payment processor platform(s) 1250 and the card network platform(s) 1245 may be configured to host, execute, and/or otherwise provide one or more applications for enabling card-based transactions. For example, the payment processor platform(s) 1250 and the card network platform(s) 1245 may facilitate transmission of transaction data (e.g., transaction details, authorization responses, etc.) between payment interfaces and bank networks. A payment processor may maintain connections with multiple different card networks. The payment processor forward transaction details, associated with a payment transaction that uses a card, to a card network corresponding to the card. Additionally, the payment processor platform(s) 1250 or the card network platform(s) 1245 may perform one or more of the authentication steps as described herein.

In one or more arrangements, the authentication platform 1210, the enterprise application host platform 1225, the enterprise user computing devices 1220, the user device(s) 1240, the payment processor platform(s) 1250, the card network platform(s) 1245, and/or other devices/systems in the computing environment 1200 may be any type of computing device capable of receiving input via a user interface, and communicating the received input to one or more other computing devices in the computing environment 1200. For example, the authentication platform 1210, the enterprise application host platform 1225, the enterprise user computing devices 1220, the user device(s) 1240, the payment processor platform(s) 1250, the card network platform(s) 1245, and/or the other devices/systems in the computing environment 1200 may, in some instances, be and/or include server computers, desktop computers, laptop computers, tablet computers, smart phones, wearable devices, or the like that may comprised of one or more processors, memories, communication interfaces, storage devices, and/ or other components. Any and/or all of the authentication platform 1210, the enterprise application host platform 1225, the enterprise user computing devices 1220, the user device(s) 1240, the payment processor platform(s) 1250, the card network platform(s) 1245, and/or the other devices/ systems in the computing environment 1200 may, in some instances, be and/or comprise special-purpose computing devices configured to perform specific functions.

Figure 13:
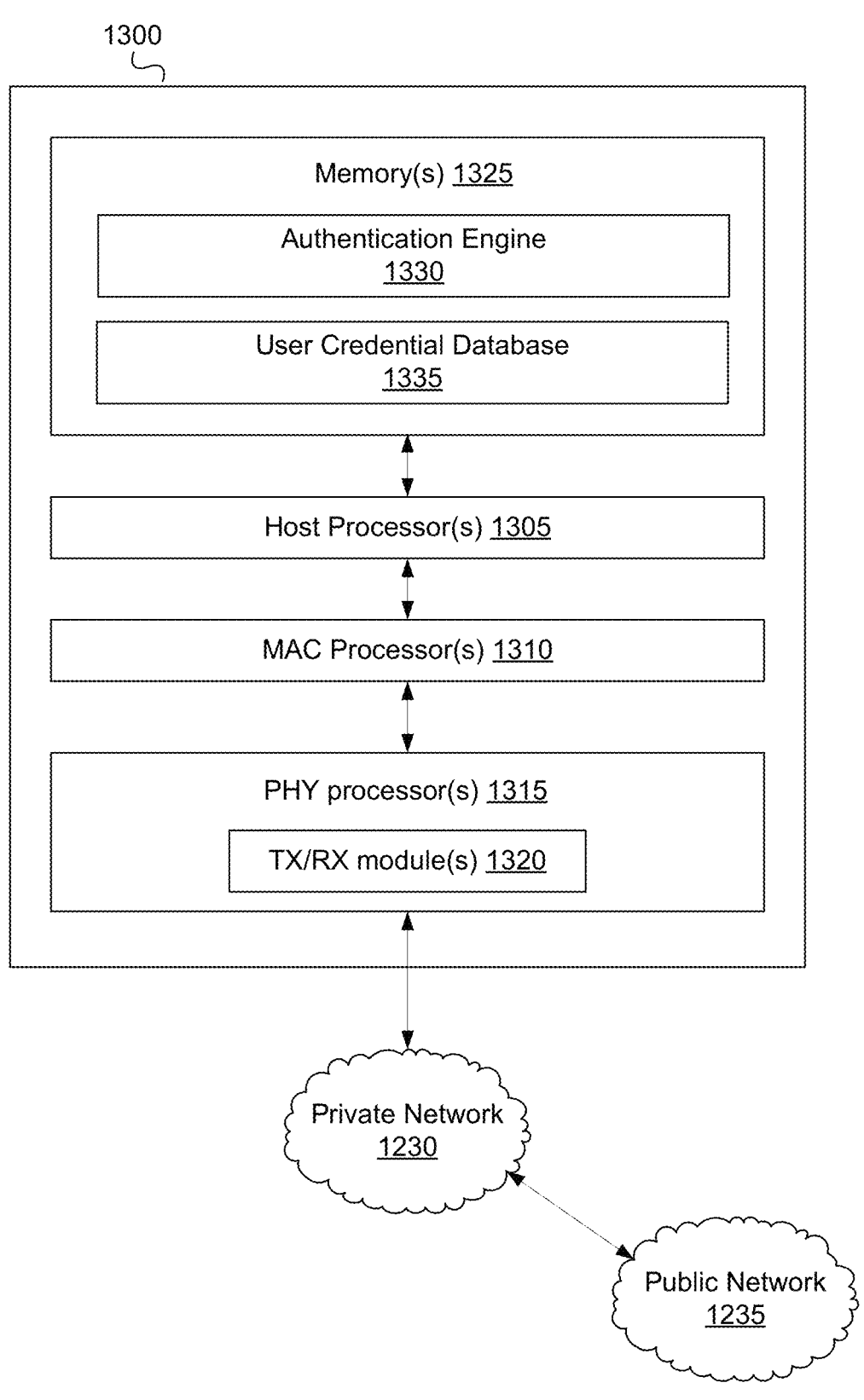
FIG. 13 shows an example computing platform, in accordance with one or more examples described herein.

FIG. 13 shows an example computing platform 1300, in accordance with one or more examples described herein. The computing platform 1300 may correspond to an authentication platform in a bank network (e.g., the authentication platform 1210), or a payment processor platform (e.g., the payment processor platform 1250). The computing platform 1300 may comprise one or more of host processor(s) 1305, medium access control (MAC) processor(s) 1310, physical layer (PHY) processor(s) 1315, transmit/receive (TX/RX) module(s) 1320, memory 1325, and/or the like. One or more data buses may interconnect host processor(s) 1305, MAC processor(s) 1310, PHY processor(s) 1315, and/or Tx/Rx module(s) 1320, and/or memory 1325. The computing platform 1300 may be implemented using one or more integrated circuits (ICs), software, or a combination thereof, configured to operate as discussed below. The host processor(s) 1305, the MAC processor(s) 1310, and the PHY processor(s) 1315 may be implemented, at least partially, on a single IC or multiple ICs. Memory 1325 may be any memory such as a random-access memory (RAM), a read-only memory (ROM), a flash memory, or any other electronically readable memory, or the like.

Messages transmitted from and received at various devices (e.g., in the computing environment 1200) may be encoded in one or more MAC data units and/or PHY data units. The MAC processor(s) 1310 and/or the PHY processor(s) 1315 of the computing platform 1300 may be configured to generate data units, and process received data units, that conform to any suitable wired and/or wireless communication protocol. For example, the MAC processor(s) 1310 may be configured to implement MAC layer functions, and the PHY processor(s) 1315 may be configured to implement PHY layer functions corresponding to the communication protocol. The MAC processor(s) 1310 may, for example, generate MAC data units (e.g., MAC protocol data units (MPDUs)), and forward the MAC data units to the PHY processor(s) 1315. The PHY processor(s) 1315 may, for example, generate PHY data units (e.g., PHY protocol data units (PPDUs)) based on the MAC data units. The generated PHY data units may be transmitted via the TX/RX module(s) 1320 over the private network 1230. Similarly, the PHY processor(s) 1315 may receive PHY data units from the TX/RX module(s) 1320, extract MAC data units encapsulated within the PHY data units, and forward the extracted MAC data units to the MAC processor(s). The MAC processor(s) 1310 may then process the MAC data units as forwarded by the PHY processor(s) 1315.

One or more processors (e.g., the host processor(s) 1305, the MAC processor(s) 1310, the PHY processor(s) 1315, and/or the like) of the computing platform 1300 may be configured to execute machine readable instructions stored in memory 1325. The memory 1325 may comprise one or more program modules/engines having instructions that when executed by the one or more processors cause the computing platform 1300 to perform one or more functions described herein. The one or more program modules/engines and/or databases may be stored by and/or maintained in different memory units of the computing platform 1300 and/or by different computing devices that may form and/or otherwise make up the computing platform 1300. For example, the memory 1325 may have, store, and/or comprise an authentication engine 1330 and/or a user credential database 1335.

The authentication engine 1330 may have instructions that direct and/or cause the computing platform 1300 to perform one or more operations relating to transaction authentication (e.g., based on or more of an OTP, an augmented biometric ID, an authentication code, etc., as described with respect to FIGS. 1-11). The user credential database 1335 may comprise user credentials, associated with a plurality of users corresponding to the issuing bank or a payment processors, that may be used for various steps corresponding to authenticating a transaction. For example, the user credential database 1335 may store a cell phone number associated with a user (e.g., for sending an OTP). The user credential database may store one or more of an OTP as sent to a user device, an augmented biometric ID associated with the user, a character mapping (e.g., as used by a digital keypad interface at a user device), a static code associated with the user, etc. The various credentials corresponding to a user may be associated, in the user credential database 1335, with a card number of a payment card of the user. In this manner, when transaction details (e.g., comprising a card number) for a user transaction are received at the computing platform 1300, the computing platform may send an OTP to a user device based on retrieving a cell phone number, and further validate a received authentication code and/or an augmented biometric ID.

While FIG. 12 illustrates the authentication platform 1210, the enterprise application host platform 1225, and the enterprise user computing devices 1220, as being separate elements connected in the private network 1230, in one or more other arrangements, functions of one or more of the above may be integrated in a single device/network of devices. For example, elements in the authentication platform 1210 (e.g., host processor(s) 1305, memory(s) 1325, MAC processor(s) 1310, PHY processor(s) 1315, TX/RX module(s) 1320, and/or one or more program/modules stored in memory(s) 1325) may share hardware and software elements with and corresponding to, for example, the enterprise application host platform 1225 and/or the enterprise user computing devices 1220.

Figure 14:
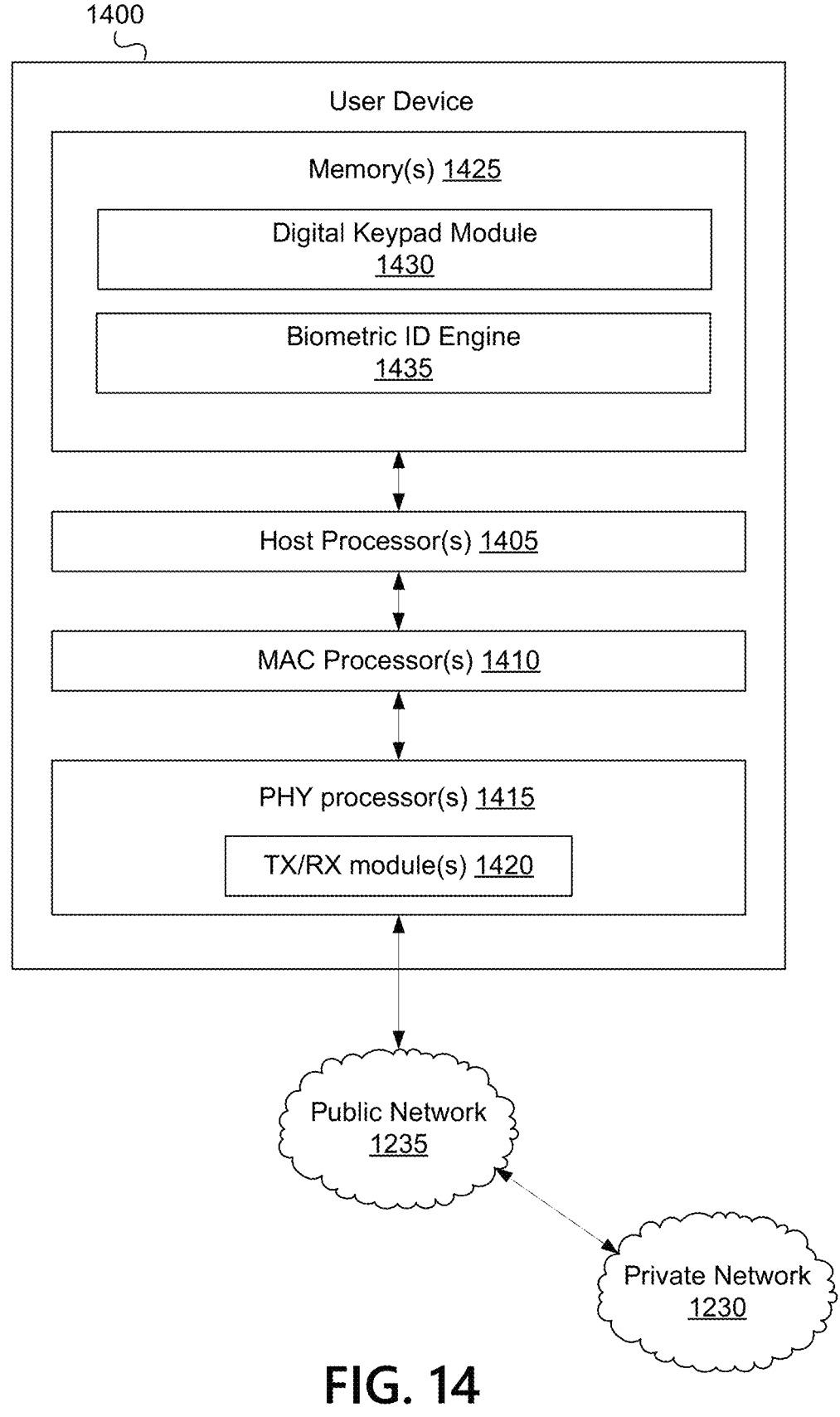
FIG. 14 shows an example user device, in accordance with one or more examples described herein.

FIG. 14 shows an example user device 1400, in accordance with one or more examples described herein. The user device 1400 may correspond to a device that may be used for multi-factor authentication as described herein. The user device 1400 may comprise one or more of host processor(s) 1405, medium access control (MAC) processor(s) 1410, physical layer (PHY) processor(s) 1415, transmit/receive (TX/RX) module(s) 1420, memory 1425, and/or the like. One or more data buses may interconnect host processor(s) 1405, MAC processor(s) 1410, PHY processor(s) 1415, and/or Tx/Rx module(s) 1420, and/or memory 1425. The user device 1400 may be implemented using one or more integrated circuits (ICs), software, or a combination thereof, configured to operate as discussed below. The host processor(s) 1405, the MAC processor(s) 1410, and the PHY processor(s) 1415 may be implemented, at least partially, on a single IC or multiple ICs. Memory 1425 may be any memory such as a random-access memory (RAM), a read-only memory (ROM), a flash memory, or any other electronically readable memory, or the like.

Messages transmitted from and received at various devices (e.g., in the computing environment 1200) may be encoded in one or more MAC data units and/or PHY data units. The MAC processor(s) 1410 and/or the PHY processor(s) 1415 of the user device 1400 may be configured to generate data units, and process received data units, that conform to any suitable wired and/or wireless communication protocol. For example, the MAC processor(s) 1410 may be configured to implement MAC layer functions, and the PHY processor(s) 1415 may be configured to implement PHY layer functions corresponding to the communication protocol. The MAC processor(s) 1410 may, for example, generate MAC data units (e.g., MAC protocol data units (MPDUs)), and forward the MAC data units to the PHY processor(s) 1415. The PHY processor(s) 1415 may, for example, generate PHY data units (e.g., PHY protocol data units (PPDUs)) based on the MAC data units. The generated PHY data units may be transmitted via the TX/RX module(s) 1420 over the private network 1230. Similarly, the PHY processor(s) 1415 may receive PHY data units from the TX/RX module(s) 1420, extract MAC data units encapsulated within the PHY data units, and forward the extracted MAC data units to the MAC processor(s). The MAC processor(s) 1410 may then process the MAC data units as forwarded by the PHY processor(s) 1415.

One or more processors (e.g., the host processor(s) 1405, the MAC processor(s) 1410, the PHY processor(s) 1415, and/or the like) of the user device 1400 may be configured to execute machine readable instructions stored in memory 1425. The memory 1425 may comprise one or more program modules/engines having instructions that when executed by the one or more processors cause the user device 1400 to perform one or more functions described herein. The one or more program modules/engines and/or databases may be stored by and/or maintained in different memory units of the user device 1400 and/or by different computing devices that may form and/or otherwise make up the user device 1400. For example, the memory 1425 may have, store, and/or comprise a digital keypad module 1430 and/or a biometric ID engine 1435.

The digital keypad module 162 may have instructions that direct and/or cause the user device 1400 to display a dynamic digital keypad interface, receive user input, and generate an encoded output (e.g., based on a received input and a keyboard mapping). The digital keypad module 162 may further cause the user device to send the encoded output for validation at an authentication platform (e.g., as described with respect to FIG. 8). The biometric ID engine may have instructions that direct and/or cause the user device 1400 to generate a 3D face map of a user using a dot projector module integrated with the user device 1400. The biometric ID engine may have instructions that direct and/or cause the user device 1400 to receive a user input (e.g., via a user interface) and generate an augmented biometric ID based on the user input and the generated 3D face map.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A user device comprising:
   one or more processors; and
   memory storing instructions that, when executed by the one or more processors, cause the user device to:
      receive, from an authentication platform, a one-time passcode (OTP) associated with an authentication request;
      receive, from the authentication platform, a character mapping, associated with a user corresponding to the user device, for a dynamic digital keypad interface that maps input characters to encoded characters, wherein:

the dynamic digital keypad interface corresponds to a graphical user interface (GUI) comprising a plurality of buttons arranged in a grid, each button, of the plurality of buttons, represents a corresponding input character, each button, of the plurality of buttons, is associated with a corresponding encoded character based on:

the character mapping, and a row and a column, in the grid, associated with the corresponding input character, and the character mapping is periodically refreshed;

receive, via the dynamic digital keypad interface, a user input;

generate, based on the user input and the character mapping, an authentication code; and send, to the authentication platform, the authentication code.

2. The user device of claim 1, wherein the instructions, when executed by the one or more processors, cause the user device to:

receive an authorization response indicating whether the authentication request is approved or declined.

3. The user device of claim 1, wherein the instructions, when executed by the one or more processors, cause the user device to:

send the authentication request, wherein the authentication request comprises a user identifier associated with the user.

4. The user device of claim 1, wherein the user input corresponds to the OTP.

5. The user device of claim 4, wherein the user input is further based on a code pattern associated with the user.

6. The user device of claim 5, wherein the user input comprises a static code interleaved with the OTP based on the code pattern.

7. The user device of claim 4, wherein the user input comprises a static code appended or prepended to the OTP.

8. The user device of claim 1, wherein the instructions, when executed by the one or more processors, cause the user device to receive the OTP via at least one of:

a short messaging service (SMS) message; or an electronic mail.

9. A method comprising:

receiving, at a user device and from an authentication platform, a one-time passcode (OTP) associated with an authentication request;

receiving, from the authentication platform, a character mapping, associated with a user corresponding to the user device, for a dynamic digital keypad interface that maps input characters to encoded characters, wherein:

the dynamic digital keypad interface corresponds to a graphical user interface (GUI) comprising a plurality of buttons arranged in a grid, each button, of the plurality of buttons, represents a corresponding input character, each button, of the plurality of buttons, is associated with a corresponding encoded character based on:

the character mapping, and a row and a column, in the grid, associated with the corresponding input character, and the character mapping is periodically refreshed;

receiving, via the dynamic digital keypad interface, a user input;

generating, based on the user input and the character mapping, an authentication code; and sending, to the authentication platform, the authentication code.

10. The method of claim 9, further comprising:

receiving an authorization response indicating whether the authentication request is approved or declined.

11. The method of claim 9, further comprising:

sending the authentication request, wherein the authentication request comprises a user identifier associated with the user.

12. The method of claim 9, wherein the user input corresponds to the OTP.

13. The method of claim 12, wherein the user input is further based on a code pattern associated with the user.

14. The method of claim 13, wherein the user input comprises a static code interleaved with the OTP based on the code pattern.

15. The method of claim 12, wherein the user input comprises a static code appended or prepended to the OTP.

16. The method of claim 9, wherein the receiving the OTP comprises receiving the OTP via at least one of:

a short messaging service (SMS) message; or an electronic mail.

17. A non-transitory computer readable medium storing instructions that, when executed, cause a user device to:

receive, from an authentication platform, a one-time passcode (OTP) associated with an authentication request;

receive, from the authentication platform, a character mapping, associated with a user corresponding to the user device, for a dynamic digital keypad interface that maps input characters to encoded characters, wherein:

the dynamic digital keypad interface corresponds to a graphical user interface (GUI) comprising a plurality of buttons arranged in a grid, each button, of the plurality of buttons, represents a corresponding input character, each button, of the plurality of buttons, is associated with a corresponding encoded character based on:

the character mapping, and a row and a column, in the grid, associated with the corresponding input character, and the character mapping is periodically refreshed;

receive, via the dynamic digital keypad interface, a user input;

generate, based on the user input and the character mapping, an authentication code; and send, to the authentication platform, the authentication code.

18. The non-transitory computer readable medium of claim 17, wherein the instructions, when executed, cause the user device to:

receive an authorization response indicating whether the authentication request is approved or declined.

\* \* \* \* \*